US008646778B2

(12) United States Patent
Best

(10) Patent No.: US 8,646,778 B2
(45) Date of Patent: Feb. 11, 2014

(54) THREE-DIMENSIONAL PUZZLE

(76) Inventor: Phillip J. Best, Crozet, VA (US)

( * ) Notice: Subject to any disclaimer, the term of this patent is extended or adjusted under 35 U.S.C. 154(b) by 319 days.

(21) Appl. No.: 13/240,408

(22) Filed: Sep. 22, 2011

(65) Prior Publication Data

US 2012/0009556 A1  Jan. 12, 2012

Related U.S. Application Data

(63) Continuation-in-part of application No. 12/952,767, filed on Nov. 23, 2010, now abandoned, which is a continuation of application No. 12/506,595, filed on Jul. 21, 2009, now Pat. No. 7,850,172, which is a continuation of application No. 11/678,715, filed on Feb. 26, 2007, now Pat. No. 7,584,961.

(51) Int. Cl.
*A63F 9/08*  (2006.01)
*A63F 13/00* (2006.01)

(52) U.S. Cl.
USPC .......... 273/138.2; 273/146; 273/145 CA; 273/145 C; 273/145 R; 273/153 R; 273/138.1; 463/9; 463/22; 463/32

(58) Field of Classification Search
USPC ........ 273/146, 145 CA, 145 C, 145 R, 138.2, 273/138.1; 463/9, 22, 32
See application file for complete search history.

(56) References Cited

U.S. PATENT DOCUMENTS

| | | |
|---|---|---|
| 4,034,986 A | 7/1977 | Weidner |
| 4,061,338 A | 12/1977 | Goldberg |
| 4,108,431 A | 8/1978 | Camara |
| 4,306,868 A | 12/1981 | Hankins |
| 4,378,116 A | 3/1983 | Rubik |
| 4,378,118 A | 3/1983 | Leonardi, Jr. |
| 4,560,164 A | 12/1985 | Darling |
| 4,708,345 A | 11/1987 | Ayers |
| 4,809,979 A * | 3/1989 | Skowronski et al. ............. 463/9 |
| 5,074,560 A | 12/1991 | Silverman |
| 5,344,145 A | 9/1994 | Chadwick et al. |
| 5,520,393 A | 5/1996 | Rickey, Jr. |
| 5,547,198 A | 8/1996 | Kaiser |
| 6,062,978 A * | 5/2000 | Martino et al. ................... 463/9 |
| 6,173,955 B1 | 1/2001 | Perrie et al. |
| 6,186,504 B1 | 2/2001 | Maxim |

(Continued)

OTHER PUBLICATIONS

Office Action dated Jan. 16, 2009 in related U.S. Appl. No. 11/678,715.

(Continued)

*Primary Examiner* — Benjamin Layno
(74) *Attorney, Agent, or Firm* — Wood, Herron & Evans, LLP

(57) ABSTRACT

A method, computer program product, and computing device comprising a game for testing the spatial reasoning of a player. The game includes a virtual multi-surfaced object having at least a first surface and a second surface, with first indicia associated with the first surface and second indicia associated with the second surface. A facing surface and a goal surface are displayed on a user interface, which also includes mechanisms for changing the orientation of the virtual object by rotating the object in steps. In response to input from the game player, the virtual object is rotated. Each time the virtual object is rotated, the facing surface displayed is changed so that it correlates to the changed orientation of the virtual object. The game continues until the game player causes the facing surface to match the goal surface by entering a series of rotational moves.

22 Claims, 14 Drawing Sheets

(56) References Cited

U.S. PATENT DOCUMENTS

| | | |
|---|---|---|
| 6,464,508 B1 | 10/2002 | Ryan |
| 6,523,825 B2 | 2/2003 | Francis |
| 6,644,664 B2 * | 11/2003 | Muir et al. .................... 273/146 |
| 7,584,961 B1 | 9/2009 | Best |
| 7,850,172 B2 | 12/2010 | Best |

OTHER PUBLICATIONS

Office Action dated Mar. 18, 2010 in related U.S. Appl. No. 12/506,595.

Office Action dated Apr. 12, 2011 in related U.S. Appl. No. 12/952,767.

* cited by examiner

THREE-DIMENSIONAL PUZZLE

CROSS-REFERENCE TO RELATED APPLICATION

This application is a continuation in part of U.S. patent application Ser. No. 12/952,767, filed on Nov. 23, 2010, by Phillip J. Best, and entitled "Three-Dimensional Puzzle", which is a continuation of U.S. Pat. No. 7,850,172, filed on Jul. 21, 2009 and issued Dec. 14, 2010 by Phillip J. Best, and entitled "Three-Dimensional Puzzle", which is a continuation of U.S. Pat. No. 7,584,961, filed on Feb. 26, 2007, and issued on Sep. 8, 2009, by Phillip J. Best, and entitled "Three-Dimensional Puzzle", the disclosures of which are incorporated herein by reference in their entireties.

FIELD OF THE INVENTION

The present invention relates to amusement and test devices and, more specifically, relates to such devices of the manipulative type for use in providing puzzles, tests for spatial logic, and the like.

BACKGROUND OF THE INVENTION

People have long been fascinated, entertained, and enlightened by logic-based puzzles. The enormous variety of such puzzles may provide delight to both children and adults. Though a number of factors relate to the enjoyability of a particular logic-based puzzle for a particular person, the level of complexity, the configurability of the pieces, and the presence of colors, symbols, and/or sounds may all contribute.

Further, apart from their use as devices for entertainment, logic-based puzzles may be used to test the spatial reasoning or logic of individuals. Studies have confirmed that analytical thought of the type elicited by such logic-based puzzles can improve one's capacity for learning and recalling information. Such tests may help determine individuals suited for a particular task, or train individuals for a particular task. For example, individuals who are candidates to be astronauts need to have a tremendous aptitude for spatial reasoning. This is because much of a routine, Earth-based analysis of various objects is based on an individual's relationship to those objects, as determined by one or more points of reference (such as the Earth's gravity). However, in space, many of these variables (e.g., gravity, or other points of reference) may not exist. Thus, the ability of an individual to understand the orientation of various objects when no standard point of reference exists can be critical.

Of the many types of logic-based puzzles, one example that is known is a 4×4 square grid having fifteen slidable tiles numbered 1-15 occupying fifteen of the sixteen spaces within the grid. Tiles can be slid sequentially into the empty space in the grid, thereby altering the relative positions of the numbered tiles. The typical solution to such a puzzle is obtained when the tiles are numerically ordered 1-15 reading left-to-right across the columns and then down the rows, for example.

Another well-known logic-based puzzle is the Rubik's Cube®. This cube-shaped puzzle has six faces each including a 3×3 grid of nine colored stickers. The stickers adhere to 26 plastic pieces emanating radially from a central core. The various perpendicular planes of eight or nine pieces are rotatable about the central core to reconfigure the cube and the arrangement of stickers thereon. The typical solution to this puzzle is obtained when all nine stickers on each face are of identical color and each of the six faces of the cube has stickers of a different color from each of the other five faces.

These and many other logic-based puzzles use recognizable patterns of colors, letters, numbers, and the like to distinguish a "solution state" from a "non-solution state." Such puzzles can be used to challenge the player's ability to form and remember spatial relationships in three dimensions. However, in each of the puzzles described above, the player can observe all of the puzzle pieces, or all sides of the cube at once, before deciding on a next "move" to make. In other words, many present puzzles allow the user to see alternative sides of the puzzle pieces by rotating the entire puzzle. They do not require the individual to remember the spatial relationship among the faces of the object, in three-dimensional space. Thus, they cannot be used to ultimately test all spatial reasoning abilities. Thus, a puzzle that allows for such testing of an individual would be desirable.

SUMMARY OF THE INVENTION

In accordance with the invention, a method, a computer program product, and a computing device for implementing a game are provided that presents a player with a challenging puzzle to solve. The nature of the game is such that it challenges the spatial reasoning of the player, thereby testing the player's spatial reasoning aptitude. Certain exemplary aspects of the invention are set forth below. It should be understood that these aspects are presented merely to provide the reader with a brief summary of certain forms the invention may take, and that these aspects are not intended to limit the scope of the invention. Indeed, the invention may encompass a variety of features and aspects that may not be set forth below.

The game includes a plurality of indicia, or symbols, including at least a first symbol and a second symbol, and a display apparatus adapted to display only one of the plurality of symbols at a time. The game further includes a mechanism that can be activated by a player to alter the symbol that is visible via the display apparatus. Thus, the first symbol is visible via the display apparatus prior to activation of the mechanism, and the second symbol is visible via the display apparatus after activation of the mechanism. Activation of the mechanism may occur once or multiple times before the second symbol is visible. The display apparatus may be a computer or computer screen, such that the game may be played on a computer.

In one embodiment, the game may be implemented as program code executed by a computer. In the computer version of the game, the plurality of symbols may comprise a computer model of at least one virtual multi-surfaced object, such as a polyhedron, with each symbol being associated with a particular surface of the object. The virtual multi-surfaced object may also be comprised of something other than a three dimensional object. The virtual multi-surfaced object includes at least a first surface and a second surface having at least a first symbol associated with the first surface and a second symbol associated with the second surface. The virtual multi-surfaced object may be selected from a plurality of virtual objects provided by the game, with each object having a different configuration, set of associated symbols, and/or number of surfaces. The player may thereby select from different virtual multi-surfaced objects depending on the desired difficulty of the game.

The game may provide at least one mechanism—such as, by way of example only, a clickable button displayed as part of a graphical user interface (GUI)—to permit the player limited rotation of the multi-surfaced object. The player may also be permitted limited rotation of the multi-surfaced object in two or more planes through separate mechanisms, with each mechanism associated with rotation in a particular plane. In response to input from the at least one mechanism, the game program code may "re-orient" the virtual multi-surfaced object by rotating the object in a horizontal plane and one vertical plane, for example. Alternatively, the at least one mechanism may permit the virtual multi-surfaced object to be rotated in two or more vertical planes, or in two or more vertical planes and the horizontal plane.

For a particular virtual multi-surfaced object, each surface may have a fixed spatial relationship with the other surfaces, with some surface pairs sharing a border (i.e., being neighboring surfaces) and other surface pairs only being connected through one or more other surfaces (i.e., being non-neighboring surfaces). The game desirably provides a view of one surface (i.e., the "top" or "facing" surface) of the virtual multi-surfaced object on the display at a time, so that the surface displayed depends on the position of the object in a three dimensional space. In other embodiments, however, additional surfaces, e.g., some or all of current neighboring surfaces, may also be displayed whenever a particular surface is being displayed.

The player's task is to rotate the virtual multi-surfaced object so that a specified surface is displayed by the game program, i.e., so that the specified surface of the object is in a "facing" orientation. Desirably, the facing orientation is effectively orthogonal to the plane of the display. In some embodiments, however, a surface may be considered to be in a facing orientation even if the surface is somewhat non-orthongonal to the plane of the display, e.g., when the surface is still visible from the user's viewpoint in the three dimensional space within which the object is disposed.

To this end, the player instructs the game program to rotate the virtual multi-surfaced object in two or more intersecting planes. This rotation may be accomplished through a series of one or more moves that adjusts the virtual multi-surfaced object from a first position where the first surface is visible, i.e., is in a facing orientation, to a second position where a second surface (e.g., the specified surface) is visible, i.e., is in a facing orientation. As the virtual multi-surfaced object is rotated from the first position to the second position, the game may update the view of the object after each move so that the surface displayed correlates with the current position of the object. To assist the player, each surface may have unique visual properties, such as a unique symbol or a distinct color, to distinguish it from each of the other surfaces. An object of the game may be for the player to accomplish the task with as few moves as possible and/or in as little time as possible.

In one particular embodiment, the virtual multi-surfaced object is a three-dimensional object, such as a virtual cube comprising 6 square interconnected surfaces. The virtual cube has a different identifying figure, or symbol, associated with each of its surfaces. The symbol may be non-symmetrical so that it provides information regarding the surface's horizontal orientation, or the symbol may be symmetrical so that the player must guess or remember the horizontal orientation. One surface of the cube, which may be a starting surface, is displayed to the player as an image that includes a specific symbol. The player is also provided with a symbol for a specified goal surface. Based on the displayed symbol, the goal symbol, and the player's knowledge of the virtual cube's configuration, the player "rotates" the virtual cube in a selected plane. In response, the game updates the displayed symbol to correlate with the new orientation of the virtual cube. This process is repeated until the specified goal surface is displayed or the player quits the game.

In embodiments where the object of the game is to accomplish the task with as few moves as possible, the number of moves it takes for a player to accomplish the task may provide a variable indicating the player's aptitude for spatial reasoning. Likewise, the amount of time the player takes to complete the game may provide another variable indicating the player's aptitude for spatial reasoning. Thus, the game presents a challenging logic-based puzzle wherein the player attempts to move the virtual multi-surfaced object from a position where a first symbol is displayed to a position where a second symbol is displayed.

Various refinements exist of the features noted above in relation to the various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of the present invention without limitation to the claimed subject matter.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

DETAILED DESCRIPTION OF THE INVENTION

Figure 1:
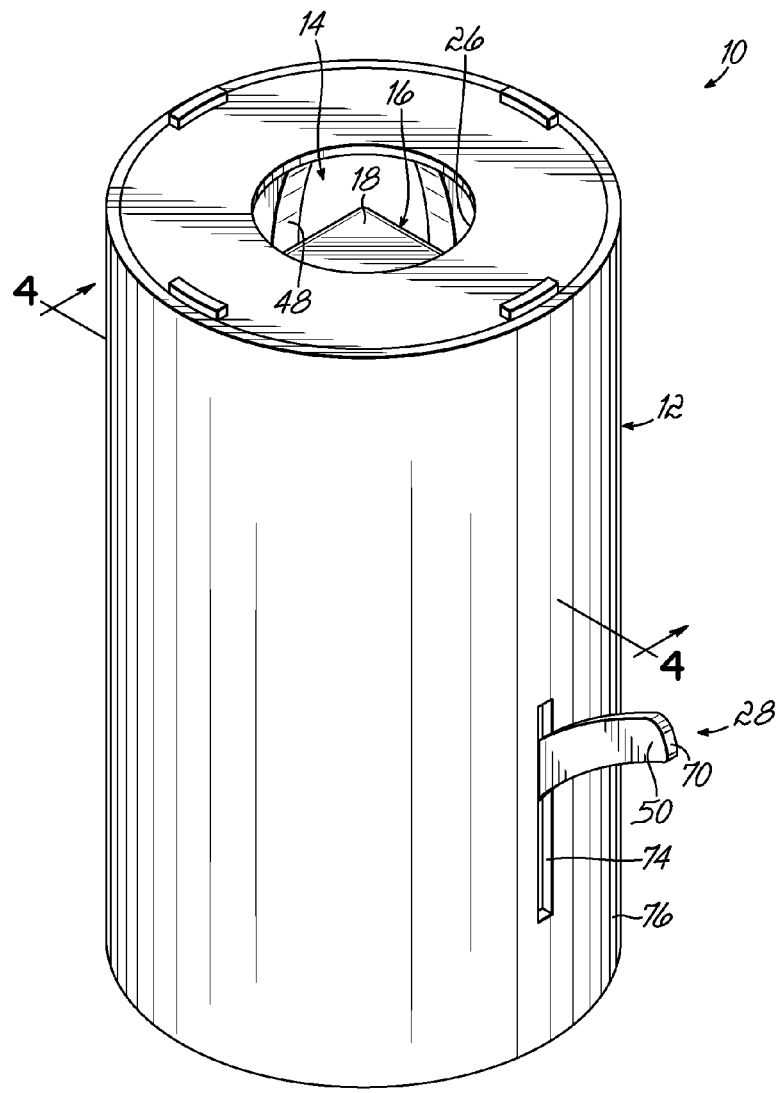
FIG. 1 is an isometric view of a first embodiment of the invention.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, which may vary from one implementation to another. Moreover, it should be appreciated that such a development effort may be complex and time-consuming, but would nevertheless be a routine undertaking of design, fabrication, and manufacture for those of ordinary skill having the benefit of this disclosure.

Referring now to the Figures, the present invention provides a puzzle or game apparatus for providing a player with a challenging puzzle or game to solve, and a game that is particularly useful for testing spatial reasoning or logic. Particularly, the game includes a plurality of symbols, including at least a first symbol and a second symbol, and a display apparatus adapted to display only one of the plurality of symbols at a time. The game further includes a mechanism that can be activated by a player, to alter the symbol that is visible on the display apparatus. Thus, the first symbol is visible on or in the display apparatus prior to activation of the mechanism, and the second surface is visible on or in the display apparatus after activation of the mechanism. The display apparatus may be a computer or computer screen, such that the game may be played on a computer. Alternatively, as described above in the Summary of the Invention, the display apparatus may be part of a hand-held apparatus.

Thus, in one embodiment, as shown in FIGS. 1-9, the apparatus 10 includes a container 12 having at least one interior compartment 14, and a multisurfaced object 16 positioned within the interior compartment 14. The multisurfaced object 16 includes at least a first surface 18 and a second surface 20 having at least a first symbol 22 disposed on the first surface 18 and a second symbol 24 disposed on the second surface 20. An opening 26 is provided in the container 12, such that at least the first surface 18 is visible through the opening 26. Thus, the opening 26 may be akin to the display screen described above. The apparatus 10 further includes a first mechanism 28 associated with the multisurfaced object 16, wherein the first mechanism 28 is adapted to rotate the multisurfaced object 16 in a first plane.

Figure 2:
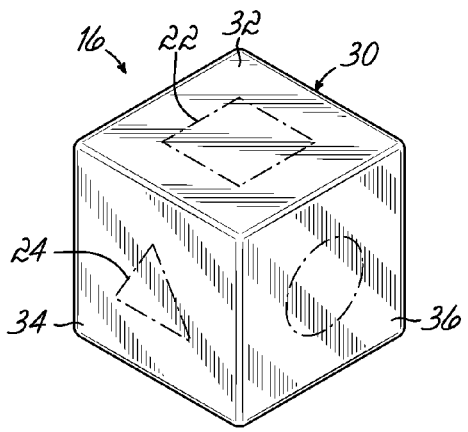
FIG. 2 is an isometric view of a multi-surfaced object, in particular a cube, depicting the top, front, and right sides.
Figure 3:
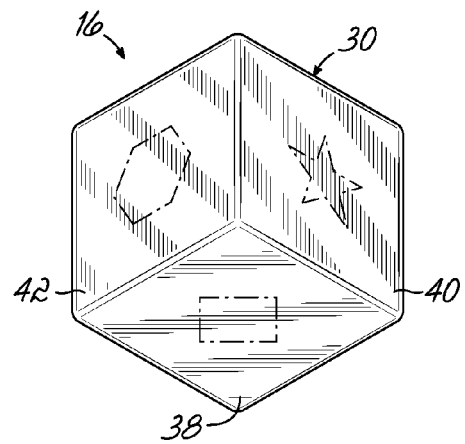
FIG. 3 is an isometric view of the multi-surfaced object of FIG. 2, depicting the bottom, rear, and left sides.

Thus, as in the illustrated embodiment, the puzzle includes a cylindrical container 12 containing a three-dimensional object. One example of such an object is a cube 30, as shown in FIGS. 2 and 3. The cube 30 has six sides: a top side 32, front side 34, right side 36, bottom side 38, rear side 40, and left side 42. The cube 30 has a different identifying figure, or symbol, on each of its sides 32, 34, 36, 38, 40, 42. The player looks through the opening 26 in the top of the container 12 and sees one surface of the cube 30, which contains a specific identifying figure. The opening 26 in the top of the cylinder is sized and shaped such that only one surface of the multisurfaced object 16 is visible at any one time. The cube 30 may be rotated so that a new surface, and thus a new symbol, is visible through the opening 26. Thus, one of these symbols would be the first symbol 22, and one of these symbols would be the second symbol 24, described above.

While the above description and the illustrated embodiment, describe and depict the container 12 as a cylinder and the multisurfaced object 16 as a cube 30, it will be recognized by those skilled in the art that containers 12 of shapes other than cylinders, and multisurfaced objects 16 other than cubes 30 can be used in accordance with the principles of the present invention. For example, the multisurfaced object 16 may be a dodecahedron, an icosahedron, or another shape. And thus, it will be further recognized by those skilled in the art that the multisurfaced object 16 may include more than first and second symbol 22, 24 associated therewith. Rather, it may include any number of symbols. Further, the opening 26 in the container 12 may be "open," like an aperture as shown in the illustrated embodiment. Alternatively, the opening 26 may be "closed," such as by a window or other transparent substance. In an embodiment where the opening 26 is "open," it may be possible for a player to manipulate the multisurfaced object 16 using one's fingers. However, the apparatus 10 may also include a separate mechanism or mechanisms for manipulating the multisurfaced object 16, regardless of whether the opening 26 is "open" or "closed."

As in the illustrated first embodiment, the apparatus 10 includes a first mechanism 28 adapted to move the multisurfaced object 16. In particular, and referring to FIGS. 4-7, the first mechanism 28 may move the multisurfaced object 16 between a first object position (shown in FIG. 4) and a second object position (shown in FIG. 7). Thus, a first surface 18, including a first symbol (not shown in FIG. 4), is visible through the opening 26 in the first object position, and a second surface 20, including a second symbol (not shown in FIG. 7), is visible through the opening 26 in the second object position. The opening 26 is adapted such that when the first symbol 22 is visible through the opening 26, the second symbol 24 is not visible through the opening 26. The movement of the multisurfaced object 16 between the first object position and the second object position may be a rotational movement between the first object position and the second object position. Such motion will be described in greater detail below. However, those skilled in the art will recognize that such rotational movement is not necessary to the present invention, and any movement that suffices to move the multisurfaced object from the first object position to the second object position will suffice.

Figure 4:
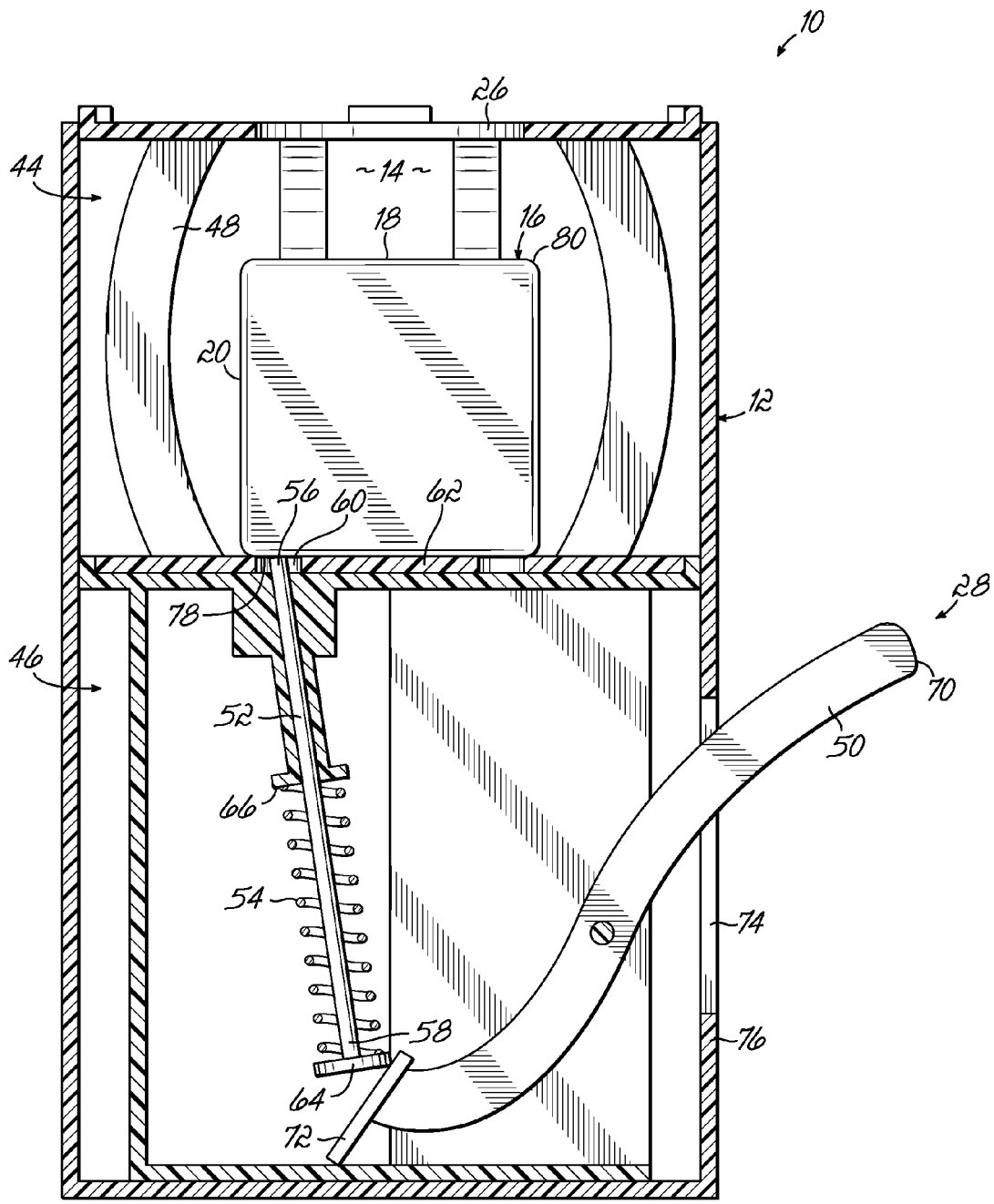
FIG. 4 is a cross-section, taken along line 4-4 of FIG. 1, showing a mechanism for moving a multi-surfaced object in a first plane, such as a vertical plane.

More specifically, the first mechanism 28 is adapted to move the multisurfaced object 16 in a first plane when activated. As referred to herein, the first plane is a plane that intersects the multisurfaced object 16 as it moves from the first object position to the second object position. Thus, the surface having the first symbol and the surface having the second symbol are both intersected by the first plane in both the first object position and in the second object position. This first plane may be a first vertical plane, as shown in FIGS. 4-7. As can be seen in FIG. 4, which shows a cross-sectional view of a first embodiment of the apparatus 10 as shown in FIG. 1, the container 12 of the apparatus 10 is separated into two chambers, an upper chamber 44 and a lower chamber 46. The upper chamber 44 houses the multisurfaced object 16 and includes the opening 26 through which the first surface 18 of the multisurfaced object 16 is visible. As can be seen, the upper chamber 44 also includes a gimbal 48, which is used to facilitate rotation of the multisurfaced object 16 within the upper chamber 44, as will be described in greater detail below. The lower chamber 46 of the container 12 includes the first mechanism 28 for rotating the multisurfaced object 16. This mechanism, 28 as shown in the illustrated embodiment, includes a lever 50, a plunger 52, and a spring 54. The plunger 52 includes first and second ends 56, 58, the first end 56 of which is disposed through an orifice 60 in a wall 62 separating the lower chamber 46 from the upper chamber 44. In this position, the first end 56 of the plunger 52 may contact and confront the multisurfaced object 16 in the upper chamber 44. The second end 58 of the plunger 52 is adapted to be contacted by the lever 50 of the first mechanism 28. The spring 54 is positioned between a cap 64 on the second end 58 of the plunger 52 and a contact surface 66 formed integrally with an inner surface 68 of the lower chamber 46. In FIG. 4, the spring 54 is shown in a rest position in an expanded state. The lever 50 includes a first end 70 and a second end 72. The first end 70 of the lever 50 extends through an orifice 74 in a sidewall 76 of the lower chamber 46, where it may be accessed by a player exterior of the container 12. The second end 72 of the lever 50 confronts the cap 64 of the plunger 52. In the position shown in FIG. 4, the mechanism 28 is not activated to rotate the multisurfaced object 16 within the upper chamber 44.

As described briefly above, the apparatus 10 may include a cage or gimbal 48 positioned within the interior compartment 14, the multisurfaced object 16 being positioned within said gimbal 48. The gimbal 48 works in concert with the first mechanism 28 to facilitate rotation of the multisurfaced object 16 in the first plane. For example, operation of the first mechanism 28 moves the multisurfaced object 16 in contact with an inner surface of the gimbal 48 to rotate the multisurfaced object 16 in the first plane. More specifically, the gimbal 48 inside the container 12 constrains the movement of the multisurfaced object 16. Operation of the first mechanism 28, as will be described below, forces the multisurfaced object 16 to rotate. The first surface 18 that was originally visible through the opening 26 of the container 12 is now rotated in a vertical position towards the right (as shown as an example in FIGS. 4-7) and the second surface 20 that was toward the left (as shown for example in the FIGS. 4-7) is now visible through the opening 26.

Figure 5:
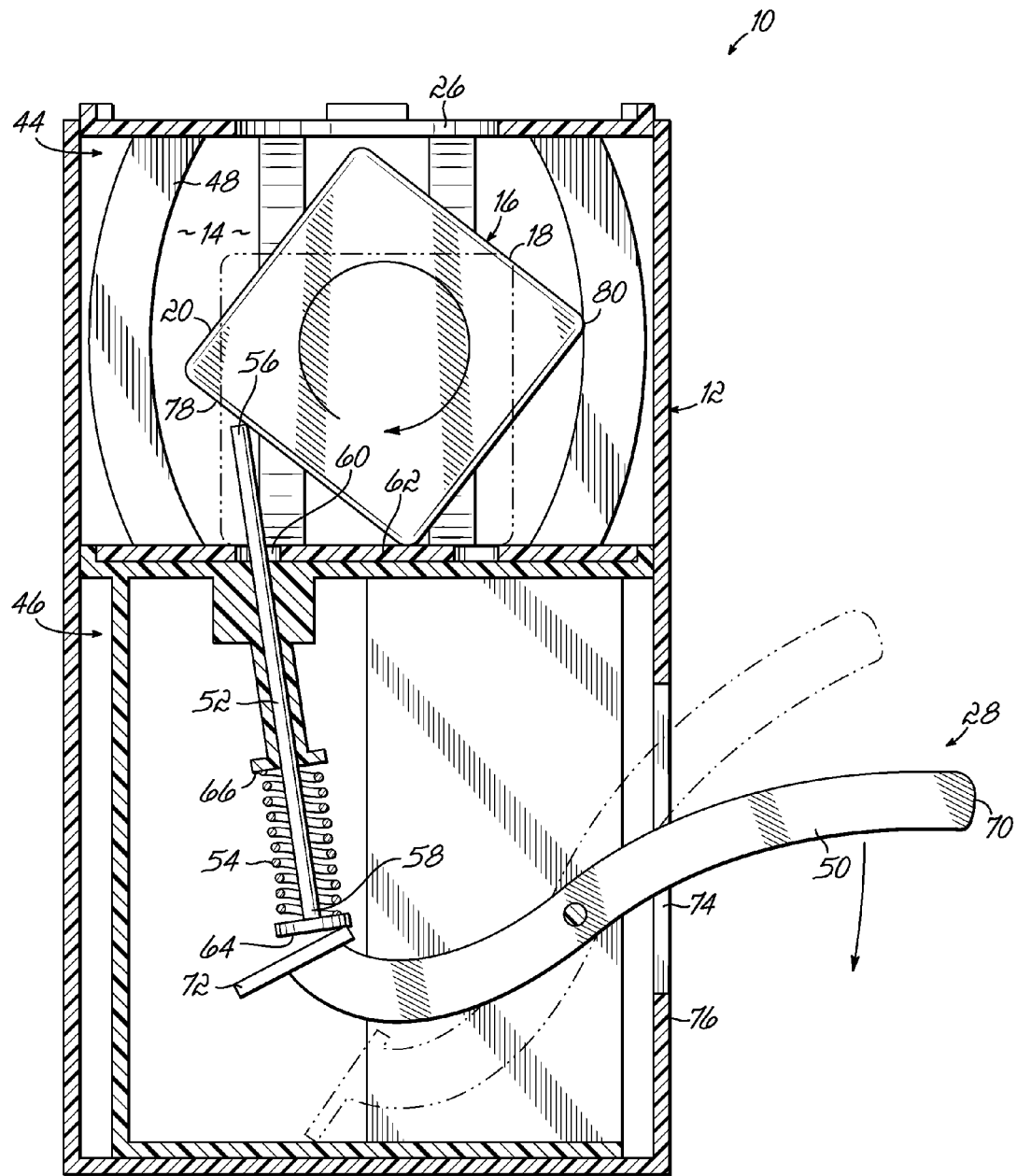
FIG. 5 is a view similar to FIG. 4, depicting the mechanism in an actuated state, and the multi-surfaced object turned slightly.
Figure 6:
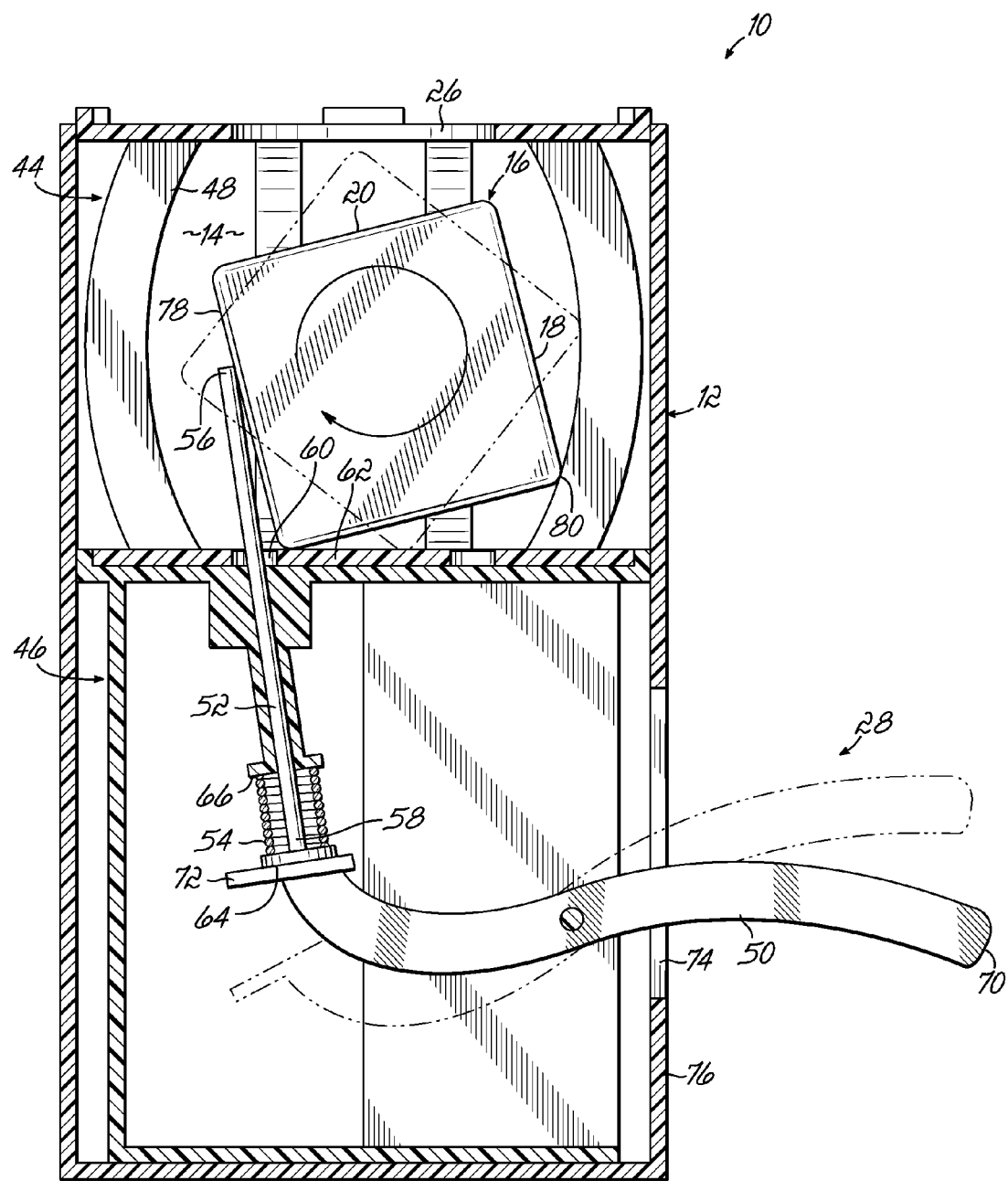
FIG. 6 is a view similar to FIG. 5, depicting the mechanism as fully actuated, and the multi-surfaced object turned past center.

When a user wishes to rotate the multisurfaced object 16 in a first plane, such as a vertical plane, the user activates the mechanism 28 by pressing on the first end 70 of the lever 50, as shown in FIGS. 5 and 6. As the lever 50 is depressed at its first end 70, the second end 72 of the lever 50 contacts the cap 64 and moves the plunger 52 against the bias of the spring 54 such that the first end 56 of the plunger 52 cooperatively moves upwardly into the upper chamber 44 of the container 12. As the plunger 52 moves in this manner, the first end 56 pushes the multisurfaced object 16 at a first edge 78 thereof in an upward direction, which causes the multisurfaced object 16 to begin to tilt in the direction of application of this force. As it does, a second edge 80 of the multisurfaced object 16 contacts the gimbal 48 in the upper chamber 44, which allows the multisurfaced object 16 to fall thereagainst to complete its rotation, as shown in FIG. 6. And, as can be seen in FIG. 6, the spring 54 is now fully compressed against its bias, and the first end 56 of the plunger 52 extends at its fullest extension into the upper chamber 44.

Figure 7:
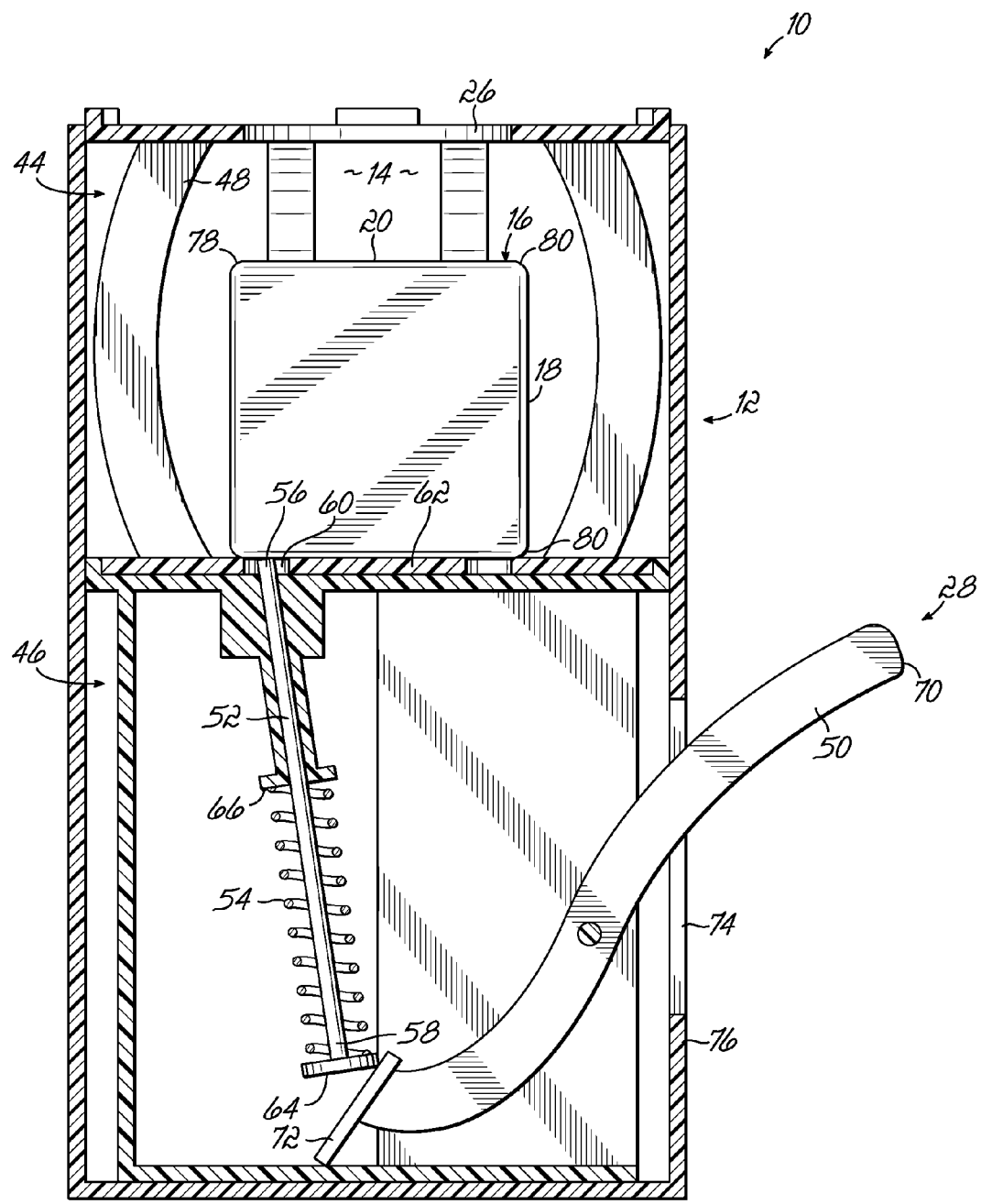
FIG. 7 is a view similar to FIG. 6, depicting the multi-surfaced object turned a full 90 degrees.

As shown in FIG. 7, upon release of the lever 50, the bias of the spring 54 will cause the plunger 52 and lever 50 to return to their initial positions, with the multisurfaced object 16 now having a second surface 20 (and thus a second symbol), now visible through the opening 26 of the upper chamber 44 of the housing. Rotation of the multisurfaced object 16 can be repeated as many times as desired by activation of the first mechanism 28.

Figure 8:
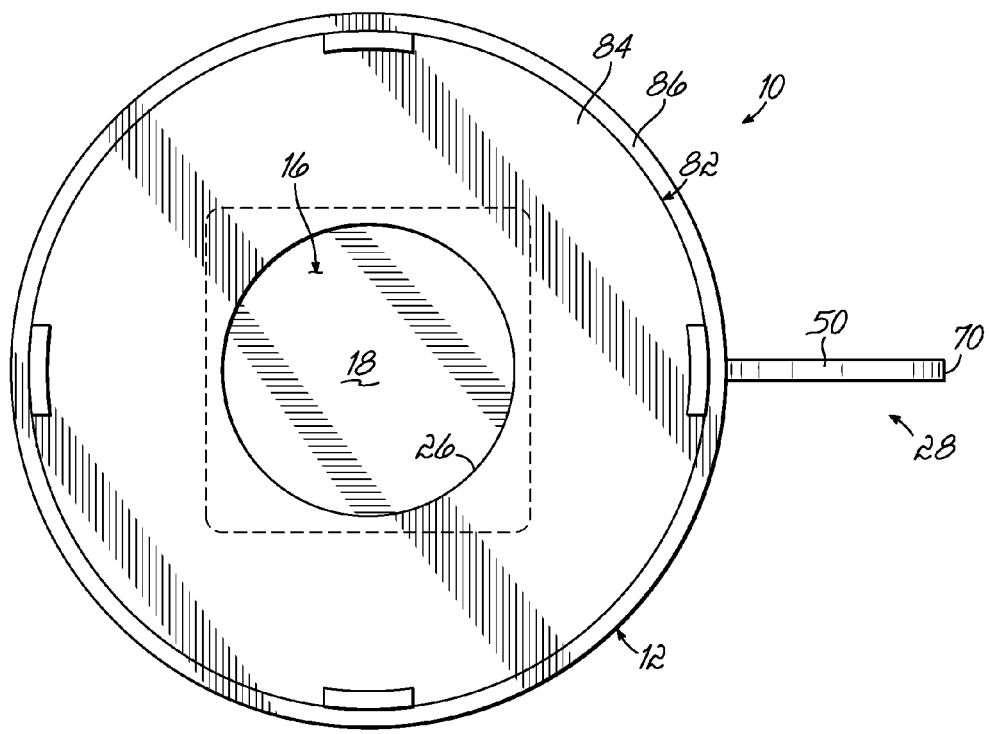
FIG. 8 is a top view of the first embodiment, showing a mechanism for moving the multi-surfaced object in a second plane, such as a horizontal plane.
Figure 9:
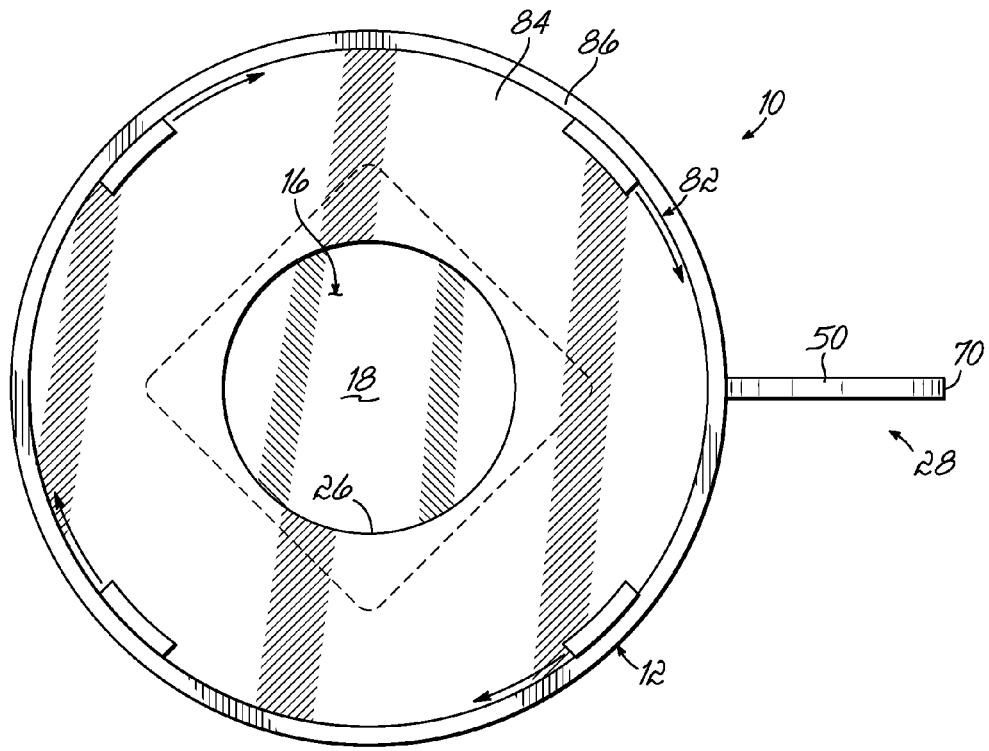
FIG. 9 is a view similar to FIG. 8, depicting the mechanism actuated, and the cube turned 45 degrees.

Referring now to FIGS. 8-9, the apparatus 10 may further comprise a second mechanism 82 adapted to relatively move the multisurfaced object 16 in a second plane (relative to the apparatus). The second plane may be substantially perpendicular to the first plane. Thus, the second mechanism 82, as in the illustrated embodiment, may include a first portion 84 of the container 12 that is movable relative to a second portion 86 of the container 12. For example, as illustrated in FIGS. 8-9, the first movable portion of the container 12 may be the upper chamber 44 of the container 12, the container 12 being in the shape of a cylindrical drum. Rotating the upper chamber 44 of the container 12 causes the multisurfaced object 16 to rotate cooperatively with the upper chamber 44. Thus, the multisurfaced object 16 rotates in a horizontal plane. More specifically, the upper chamber 44 is operatively connected to the multisurfaced object 16, such that the upper chamber 44 and the multisurfaced object 16 cooperatively move relative to the lower chamber 46, which houses a substantial portion of the first mechanism 28 for rotating the multisurfaced object 16 in the vertical plane, as described above. Thus, once rotated in the horizontal plane, the lever 50 may once again be depressed to rotate the multisurfaced object 16 again. Those skilled in the art will recognize that while rotation in the horizontal direction is described as rotating a portion of the container 12 to cooperatively rotate the multisurfaced object 16, it will be recognized that the multisurfaced object 16 is simply rotated relative to the first mechanism 28 so that the multisurfaced object 16 can be thereafter rotated by the first mechanism 28 in a different plane. Thus, those skilled in the art will recognize that the lower chamber 46 of the cylindrical drum including the first mechanism 28 may also be rotated relative to the multisurfaced object 16 and the remainder of the container 12. Further, those skilled in the art will recognize that the multisurfaced object 16 itself may solely be rotated relative to both the upper and lower chambers 44, 46.

Referring now to FIGS. 10-13, an alternate embodiment of a mechanism to move a multisurfaced object 16' is shown. In particular, a first mechanism 28' may move the multisurfaced object 16' between a first object position (shown in FIG. 10) and a second object position (shown in FIG. 13). Thus, a first surface 18', including a first symbol (not shown in FIG. 10), is visible through an opening 26' in the first object position, and a second surface 20', including a second symbol (not shown in FIG. 13), is visible through the opening 26' in the second object position. The opening 26' is adapted such that when the first symbol is visible through the opening 26', the second symbol is not visible through the opening 26'. The movement of the multisurfaced object 16' between the first object position and the second object position may be a rotational movement between the first object position and the second object position. Such motion will be described in greater detail below. However, those skilled in the art will recognize that such rotational movement is not necessary to the present invention, and any movement that suffices to move the multisurfaced object 16' from the first object position to the second object position will suffice.

Figure 10:
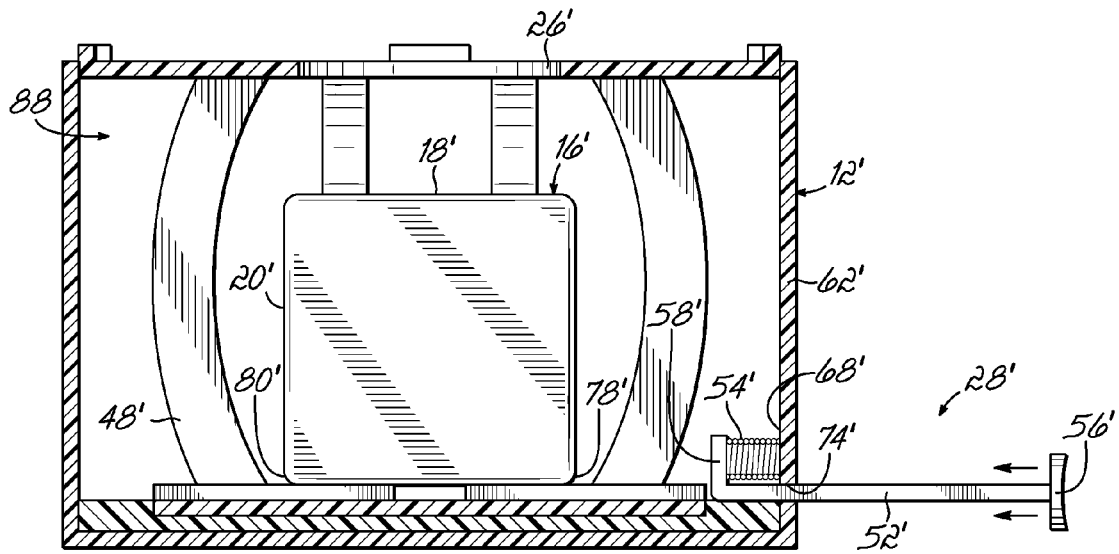
FIG. 10 is a cross-section similar to that of FIG. 4, but depicting a second embodiment of the invention.

More specifically, the first mechanism 28' is adapted to move the multisurfaced object 16' in a first plane when activated. As referred to herein, the first plane is a plane that intersects the multisurfaced object 16' as it moves from the first object position to the second object position. Thus, the surface 18' having the first symbol and the surface 20' having the second symbol are both intersected by the first plane in both the first object position and in the second object position. This first plane may be a first vertical plane, as shown in FIGS. 10-13. As can be seen in FIG. 10, the container 12' of the apparatus 10' includes only a single chamber 88. The chamber 88 houses the multisurfaced object 16' and includes the opening 26' through which the first surface 18' of the multisurfaced object 16' is visible. As can be seen, the chamber 88 also includes a gimbal 48', which is used to facilitate rotation of the multisurfaced object 16' within the chamber 88. The chamber 88 of the container 12' also includes the first mechanism 28' for rotating the multisurfaced object 16'. This mechanism 28', as shown in the illustrated embodiment, includes a plunger 52' and a spring 54'. The plunger 52' includes first and second ends 56', 58', and is disposed through an orifice 74' in a wall 62' of the chamber 88 such that a first end 56' may be accessed by a user. In this position, the second end 58' of the plunger 52' is disposed within the chamber 88, and may be moved to contact and confront the multisurfaced object 16'. A spring 54' is positioned between an inner surface 68' of a wall 62' of the chamber 88 and the second end 58' of the plunger 52'. The spring 54', at its ends, is operatively connected to the inner surface 68' of wall 62' and to the second end 58' of the plunger 52'. In FIG. 10, the spring 54' is shown in a rest position in a compressed state. The bias of the spring 54' to this rest position retains the plunger 52' in a position extended outside of the container 12', and the second end 58' does not contact the multisurfaced object 16'. In the position shown in FIG. 10, the mechanism 28' is not activated to rotate the multisurfaced 16' object within the chamber 88.

Figure 11:
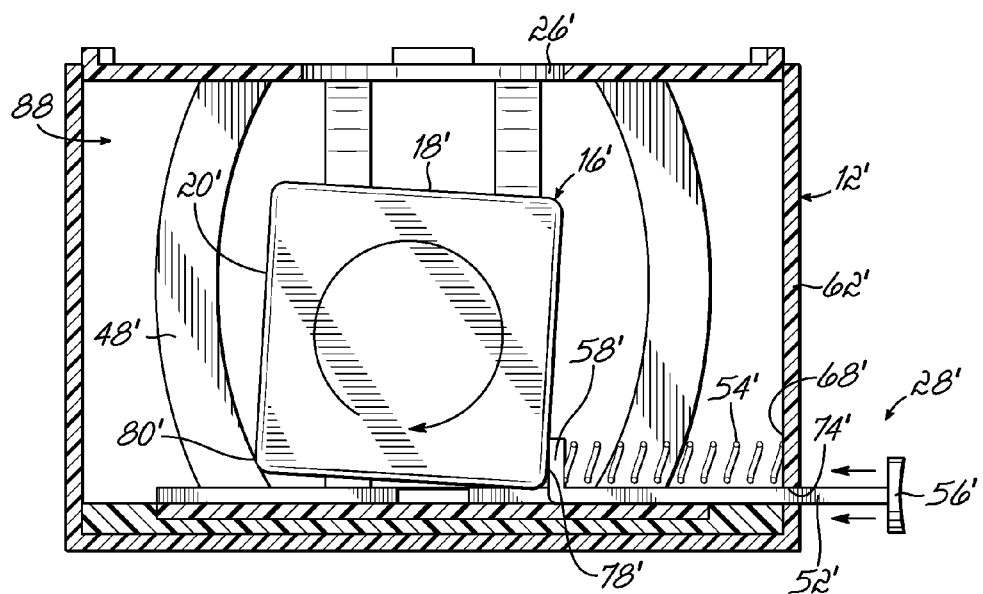
FIG. 11 is a view similar to FIG. 10, depicting the mechanism in an actuated state, and the multi-surfaced object turned slightly.
Figure 12:
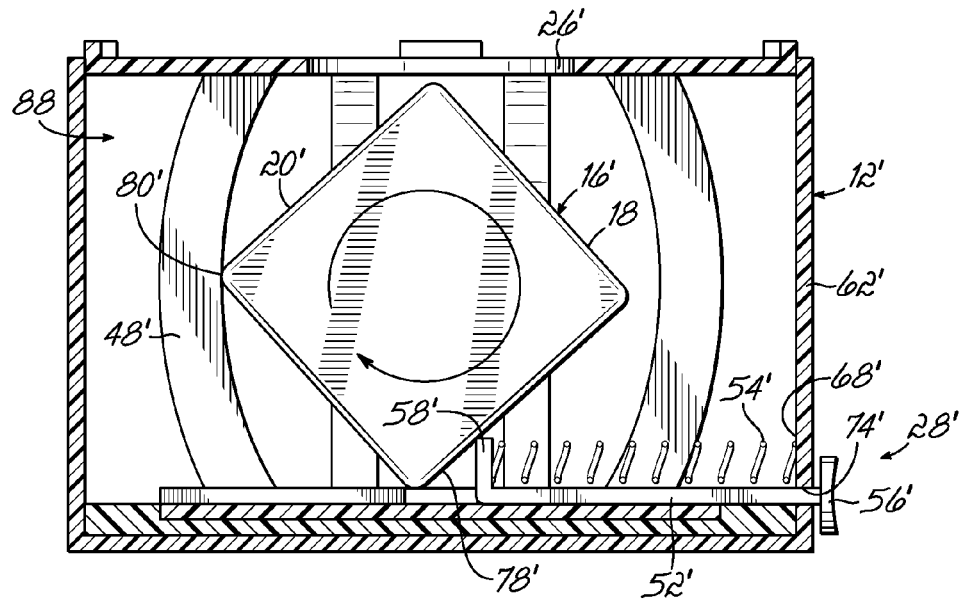
FIG. 12 is a view similar to FIG. 11, depicting the mechanism as fully actuated, and the multi-surfaced object turned past center.
Figure 13:
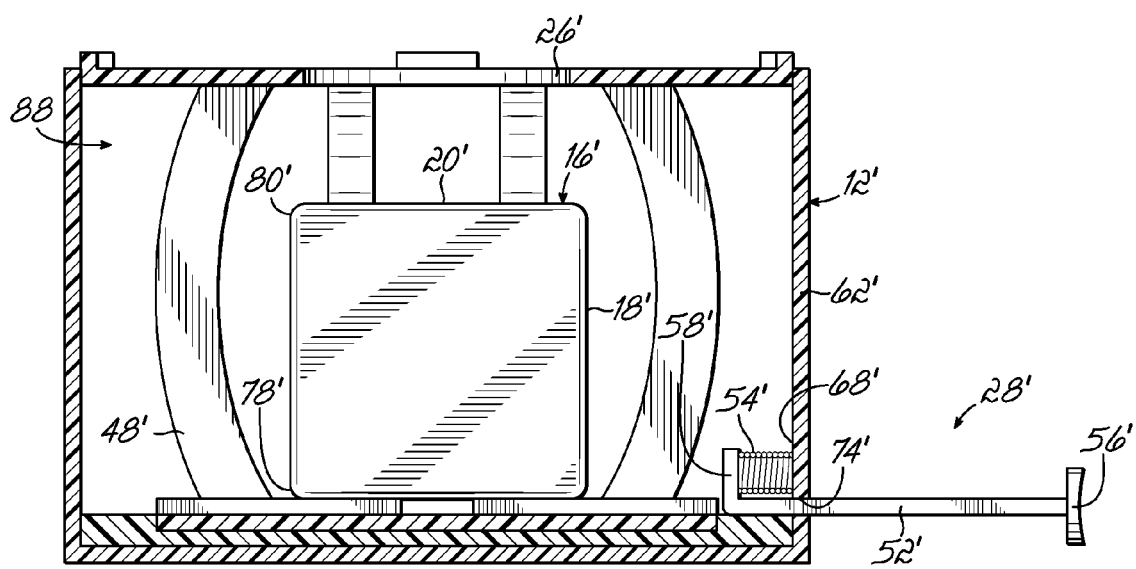
FIG. 13 is a view similar to FIG. 12, depicting the multi-surfaced object turned a full 90 degrees.

When a user wishes to rotate the multisurfaced object 16' in a first plane, such as a vertical plane, the user activates the mechanism 28' by pressing on the plunger 52' in a direction opposite to the bias of the spring 54', as shown in FIGS. 11 and 12. As the plunger 52' is depressed at its first end 56', the second end 58' of the plunger 52' moves against the bias of the spring 54', such that the second end 58' of the plunger 52' contacts and pushes the multisurfaced object 16' proximal to a first edge 78' thereof, which causes the multisurfaced object 16' to begin to tilt in the direction of application of this force. As it does, a second edge 80' of the multisurfaced object 16' contacts the gimbal 48' in the chamber 88, which allows the multisurfaced object 16' to ride thereagainst to complete its rotation, as shown in FIG. 13. And, as can be seen in FIG. 13, upon completion of rotation of the multisurfaced object 16' and release of the plunger 52', the bias of the spring 54' causes the spring 54' to return to its rest position, with the first end 56' of the plunger 52' extending at its fullest extension outside the container 12'. Thus, the bias of the spring 54' will cause the plunger 52' to return to its initial position, with the multisurfaced object 16' now having a second surface 20' (and thus a second symbol 24'), now visible through the opening 26' of the container 12'.

Figure 14:
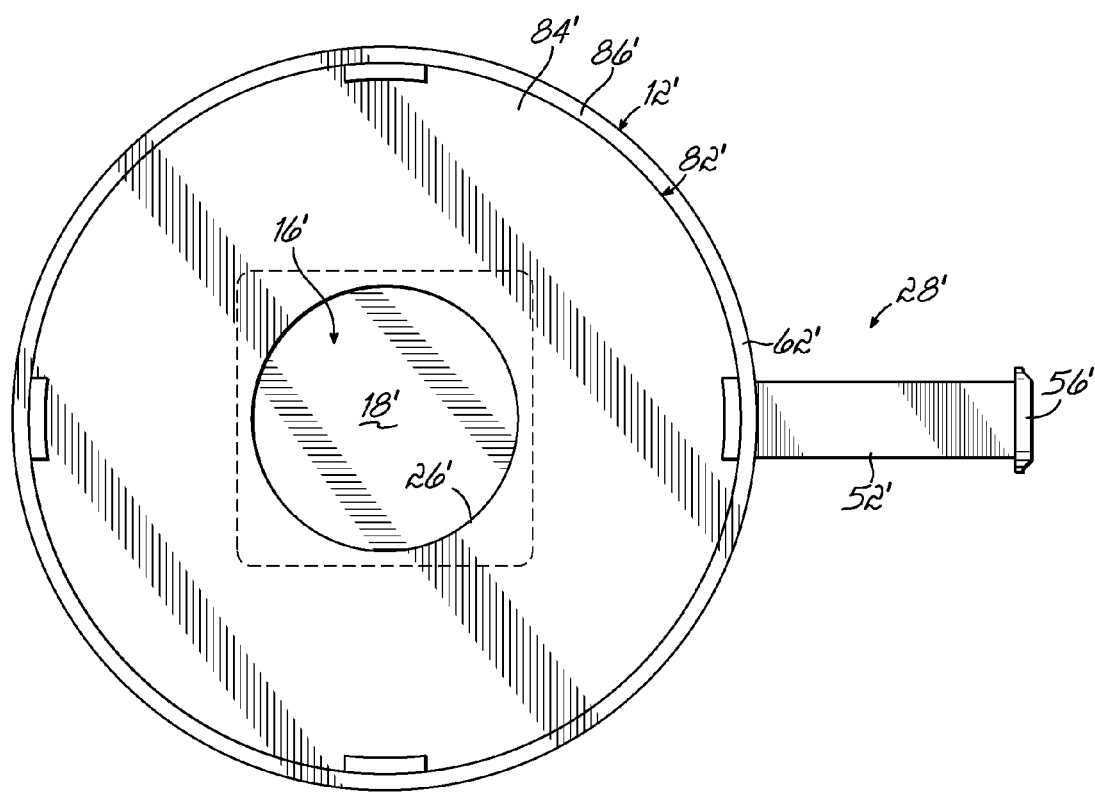
FIG. 14 is a top view of the second embodiment of the invention, depicting first and second mechanisms, one for rotating the multi-surfaced object in a first plane, such as a vertical plane, and one for rotating the multi-surfaced object in a second plane, such as a horizontal plane.

Referring now to FIG. 14, the apparatus 10 may further comprise a second mechanism 82' adapted to move the multisurfaced object 16' in a second plane. The second plane may be substantially perpendicular to the first plane. Thus, the second mechanism 82' may include a first portion 84' of the container 12' that is movable relative to a second portion 86' of the container 12'. For example, as illustrated in FIG. 14, the first movable portion of the container 12' may be an inner portion chamber 88' of the container 12', the container 12' being in the shape of a cylindrical drum. Rotating the chamber 88 of the container 12' causes the multisurfaced object 16' to rotate cooperatively with the chamber 88. Thus, the multisurfaced object 16' rotates in a horizontal plane. More specifically, the chamber 88 is operatively connected to the multisurfaced object 16', such that the chamber 88 and the multisurfaced object 16' cooperatively move relative to an outer portion 86' of the chamber 88, which houses a substantial portion of the first mechanism 28' for rotating the multisurfaced object 16' in the vertical plane, as described above. Thus, once rotated in the horizontal plane, the lever 52' may once again be depressed to rotate the multisurfaced object 16' again. Those skilled in the art will recognize that while rotation in the horizontal direction is described as rotating a portion of the container 12' to cooperatively rotate the multisurfaced object 16', it will be recognized that the multisurfaced object 16' is simply rotated relative to the first mechanism 28' so that the multisurfaced object 16' can be thereafter rotated by the first mechanism 28' in a different plane. Thus, those skilled in the art will recognize that the outer portion of the chamber 88 of the cylindrical drum including the first mechanism 28' may also be rotated relative to the multisurfaced object 16' and the remainder of the container 12'. Further, those skilled in the art will recognize that the multisurfaced object 16' itself may solely be rotated relative to the chamber 88.

Figure 15:
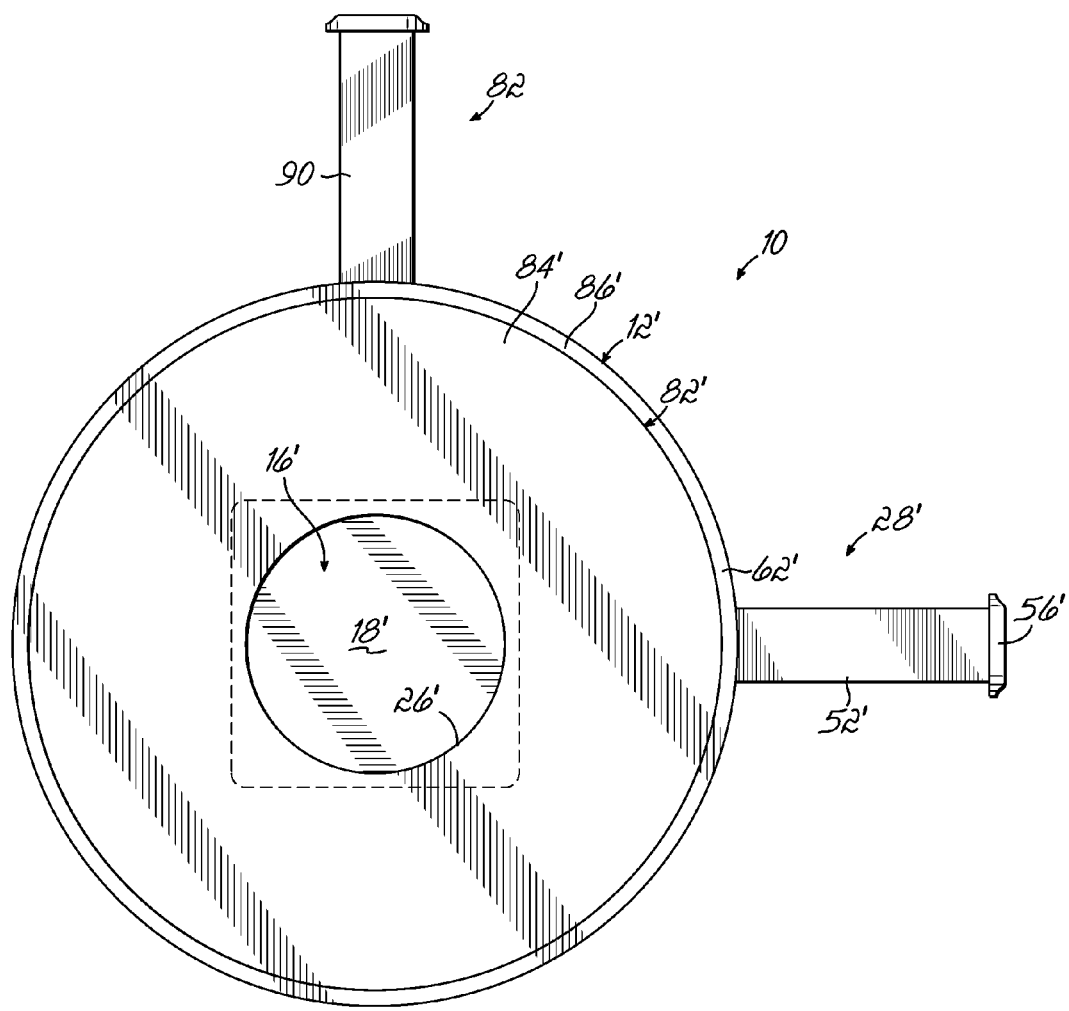
FIG. 15 is a top view of a third embodiment, depicting first and second mechanisms.

As an alternative to the embodiment described above, and referring to FIG. 15, the apparatus 10 may include a second mechanism 82 including a second lever 90 or handle that rotates the multisurfaced object 16 in a second plane, being a second vertical plane. In such an embodiment, the second mechanism 82 would operate as the first mechanism 28 of FIGS. 4-7 or the first mechanism 28' of FIGS. 10-13. In this embodiment, the second vertical plane is perpendicular to the first vertical plane.

Thus, the cylinder is equipped with two levers 52', 90 to permit the player limited rotation of the multisurfaced object 16' in two planes by manipulating the levers outside of the container 12'. The levers may be operatively connected to springs and/or plungers (not shown) inside the container 12' for rotating the multisurfaced object 16' in two vertical planes. Thus, depressing a first lever 52' rotates the multisurfaced object 16' in a first vertical plane to reveal another surface and different symbol. And instead of rotating the multisurfaced object 16' relative to the chamber of the container 12' to effect movement of the multisurfaced object 16' in the horizontal plane, as in the illustrated embodiment of FIGS. 8-9 described above, a second lever 90 is provided to rotate the multisurfaced object 16' in a different vertical plane, which is perpendicular to the first vertical plane.

Further, the difficulty or relative ease of the game apparatus 10 can be dependent on the symbols disposed on surfaces of the multisurfaced object 16. For example, if the symbols on each surface of the multisurfaced object 16 were symmetrical, they would provide no information about the relative positions of the other surfaces of the multisurfaced object 16 (for example, the square and circle shown in FIG. 2). However, if each symbol has dimensionality, for example, a top, bottom, left, and right side (such as a face), then the game will be relatively easy because the operator can more easily ascertain which way the multisurfaced object 16 faces. However, even using dimensionality, the relative ease of the game can be altered by the manner in which the symbols are ordered on the surfaces of the multisurfaced object 16. For example, the problem is made easier if the orientation of the figures "makes sense," such that both profiles are directed to the side where the front of the symbol (such as a face) appears.

Figure 16:
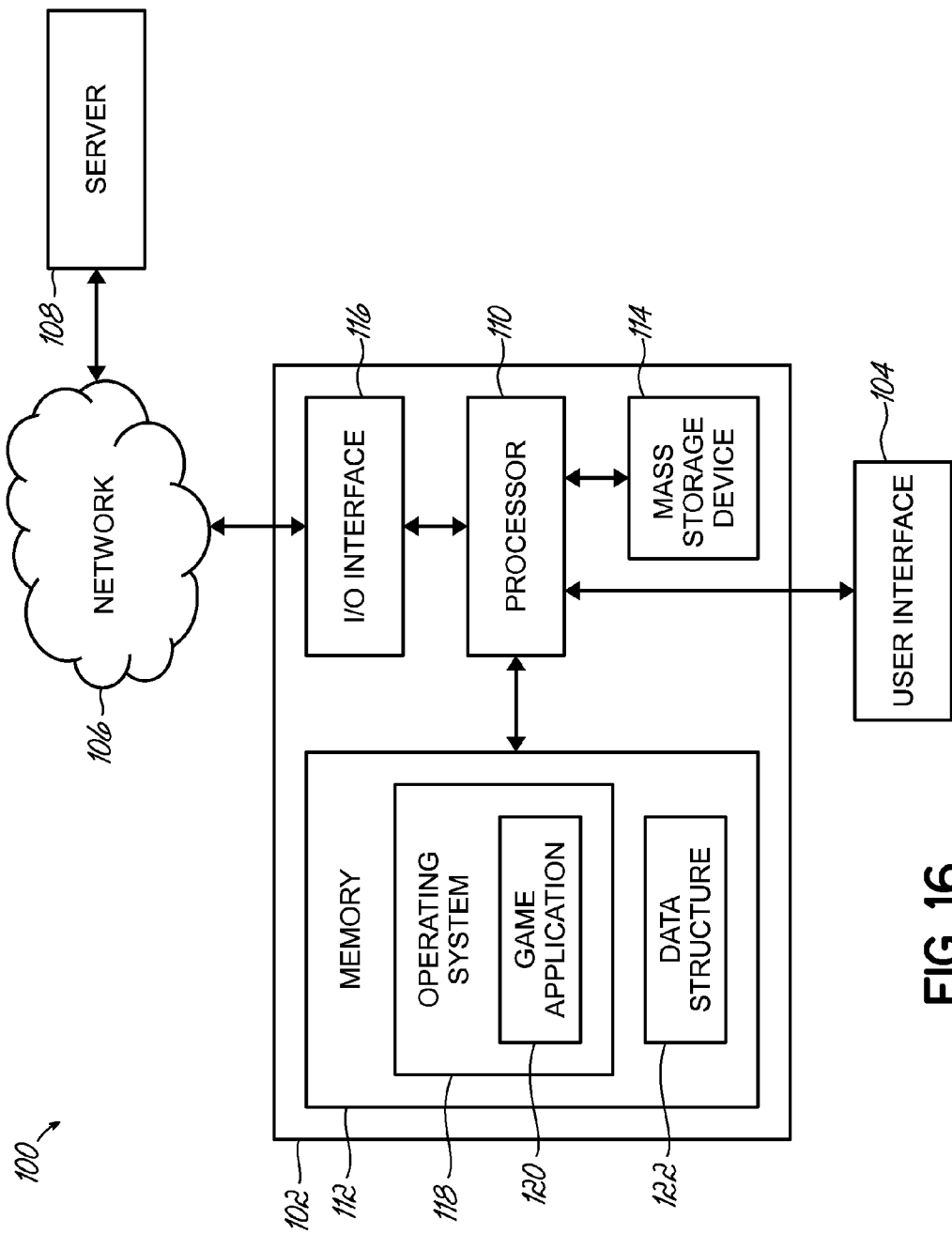
FIG. 16 is a schematic of a computing system hosting a fourth embodiment of the game as a computer game application.

Referring now to FIG. 16, a computing system 100 is illustrated with a hardware platform 102, a user interface 104, as well as an optional network 106 and server 108. The network 106 may include the Internet, and may provide a communication link between the hardware platform 102 and the server 108 using known methods so that the hardware platform 102 and server 108 may interact by exchanging information over the network 106.

The hardware platform 102 may include a processor 110 operatively coupled to a memory 112, a mass storage device 114, and an input/output (I/O) interface 116. Exemplary embodiments of the hardware platform 102 may include, but are not limited to, multi-user or single-user computers, desktop computers, laptop computers, portable computers and devices, tablet and touch pad computers and devices, handheld computers and devices, network devices, mobile phones, smart phones, servers, game consoles, set top boxes, handheld game consoles, or any other suitable device known by persons having ordinary skill in the art. The processor 110 may comprise one or more devices selected from microprocessors, micro-controllers, digital signal processors, microcomputers, central processing units, field programmable gate arrays, programmable logic devices, state machines, logic circuits, analog circuits, digital circuits, and/or any other device or devices that manipulate signals (analog and/or digital) based on operational instructions that are stored in memory 112. Memory 112 may be a single memory device or a plurality of memory devices including but not limited to read-only memory (ROM), random access memory (RAM), volatile memory, non-volatile memory, static random access memory (SRAM), dynamic random access memory (DRAM), flash memory, cache memory, and/or any other device capable of storing computer readable information. Memory 112 may also include memory integrated with processor 110. Mass storage device 114 may be a single mass storage device or a plurality of mass storage devices including but not limited to hard drives, optical drives, tape drives, non-volatile solid state devices and/or any other device capable of storing computer readable information. The I/O interface 114 may provide the processor 110 with one or more communication links to one or more external devices, such as the network 106 and/or server 108. To this end, the I/O interface 114 may employ one or more suitable communication protocols, such as the Transmission Control Protocol/Internet Protocol (TCP/IP) for communicating with the one or more external devices.

Processor 110 may operate under the control of and/or otherwise rely upon various software applications, components, programs, files, objects, modules, routines, etc. (hereinafter, "program code") residing in memory 112. This program code may include an operating system 118 that manages hardware platform resources for additional program code embodied as one or more computer software applications, such as a game application 120, residing in memory 112. The operating system 118 may thereby provide a mechanism by which the game application 120 has instructions executed by the processor 110. The game application 120 may be configured to run on top of the operating system 118 (as illustrated in FIG. 16), or directly on the processor 110 as a "standalone" application. The game application 120 may include program code that, when read and executed by the processor 110, causes the computing system 100 to perform the steps necessary to execute steps, elements, and/or blocks embodying the various aspects of the invention. Memory 112 may be further inhabited by one or more data structures 122 containing data accessible by the game application 120, such as game data, working set data, and/or stored command functions executed by processor 110.

The user interface 104 may be operatively coupled to the processor 110 of hardware platform 102 in a known manner. The user interface 104 may include output devices, such as alphanumeric displays, video monitors, touch screens, audio transducers, and/or any other suitable audio or visual indicators. The user interface 104 may also include input devices and controls, such as an alphanumeric keyboard, a pointing device (such as a mouse), keypads, pushbuttons, control knobs, game controllers, touch screens, joy sticks, etc., capable of accepting commands or input from the operator and transmitting the entered input to the processor 110. The user interface 104 thereby provides a mechanism whereby a game player may interact with the game application 120.

In an alternative embodiment of the invention, the server 108 may be a hardware platform including processor and memory that hosts one or more server applications, such as a web server application and/or the game application 120. The one or more server applications may include program code configured to generate web pages or other digital files and media that may be accessed by client applications, such as a client browser application, running on hardware platform 102. The server 108 may thereby operate as a game server that provides a remote gaming capability to the hardware platform 102 over the network 106. In this configuration, a player may access the game application 120 on the server 108 using a web browser or other suitable client application running on the hardware platform 102.

In another embodiment, the server 108 may upload program code to the hardware platform 102. The steps necessary to execute steps, elements, and/or blocks embodying the various aspects of the invention may then be performed by executing the uploaded program code on the hardware platform 102. The uploaded program code may be the game application 120 or an applet running on the operating system 118 or processor 110. The uploaded program code may also include HyperText Markup Language (HTML), Cascading Style Sheets (CSS), and/or JavaScript configured so that the game may be executed by a web browser running on the hardware platform 102. The uploaded program code may also include code executed by a web browser plugin, such as Adobe Flash® or Adobe Shockwave® (available from Adobe Systems of San Jose, Calif.), Microsoft Silverlight® (available from Microsoft), Java® (available from Oracle America, Inc. located in Redwood Shores Calif.), and/or any other suitable browser plug in application.

In one specific example, the game may be played through a browser interface using an object oriented scripting language, such as JavaScript®, which is available from Oracle America, Inc. In the game server configuration, the browser may perform game display functions at the hardware platform 102, while backend calculations are performed in the server 108. The display and backend calculation parts of game application 120 may communicate by serializing and de-serializing Extensible Markup Language (XML) into the needed data, and transmitting the data over a communications link established over the network 106. By separating the game into a backend calculation module and a display function module, the remote server configuration may facilitate adaptations for multiple computing environments. Advantageously, the network 106 and server 108 would thereby allow the game to run on any hardware platform 102 having a compatible web browser. The network 106 may also include one or more links to the Internet so that the player could access the game from any hardware platform 102 operatively connected to the Internet. By centralizing control of the game, the game server configuration may also facilitate control of game play and maintaining player performance statistics, which may facilitate obtaining and evaluating data on the player's spatial reasoning aptitude.

The program code executed to implement the embodiments of the invention may be implemented as part of an operating system or a specific application, component, program, object, module or sequence of operations executed by one or more processors of the computing system 100. The program code typically comprises instructions that are resident at various times in various memories and/or storage devices in the computing system 100, and that, when executed by one or more processors of the computing system 100, may cause the computing system 100 to perform the steps necessary to implement various aspects of the invention. In addition, those skilled in the art will recognize that embodiments of the invention are not limited to particular types or configurations of processors or memory and/or storage devices.

While the invention has and hereinafter will be described in the context of fully functioning computing systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include, for example, non-transitory recordable type media such as volatile and nonvolatile memory devices, floppy and other removable disks, hard disk drives, solid state drives, USB drives, and optical disks (e.g. CD-ROM's, DVD's, Blu-Ray discs, etc.), among others.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment(s) illustrated in FIG. 16 are not intended to limit the invention. Indeed, those skilled in the art will recognize that other alternative hardware and/or software environments, and incorporating different numbers and configurations of hardware resources, may be used without departing from the scope of the invention. Those skilled in the art will also recognize that the invention contemplates all types of computing systems, including computing systems and other programmable electronic devices configured with processors, memory and/or storage devices, including, for example, client computers, server computers, portable computers, handheld computers, embedded controllers, etc.

Figure 17:
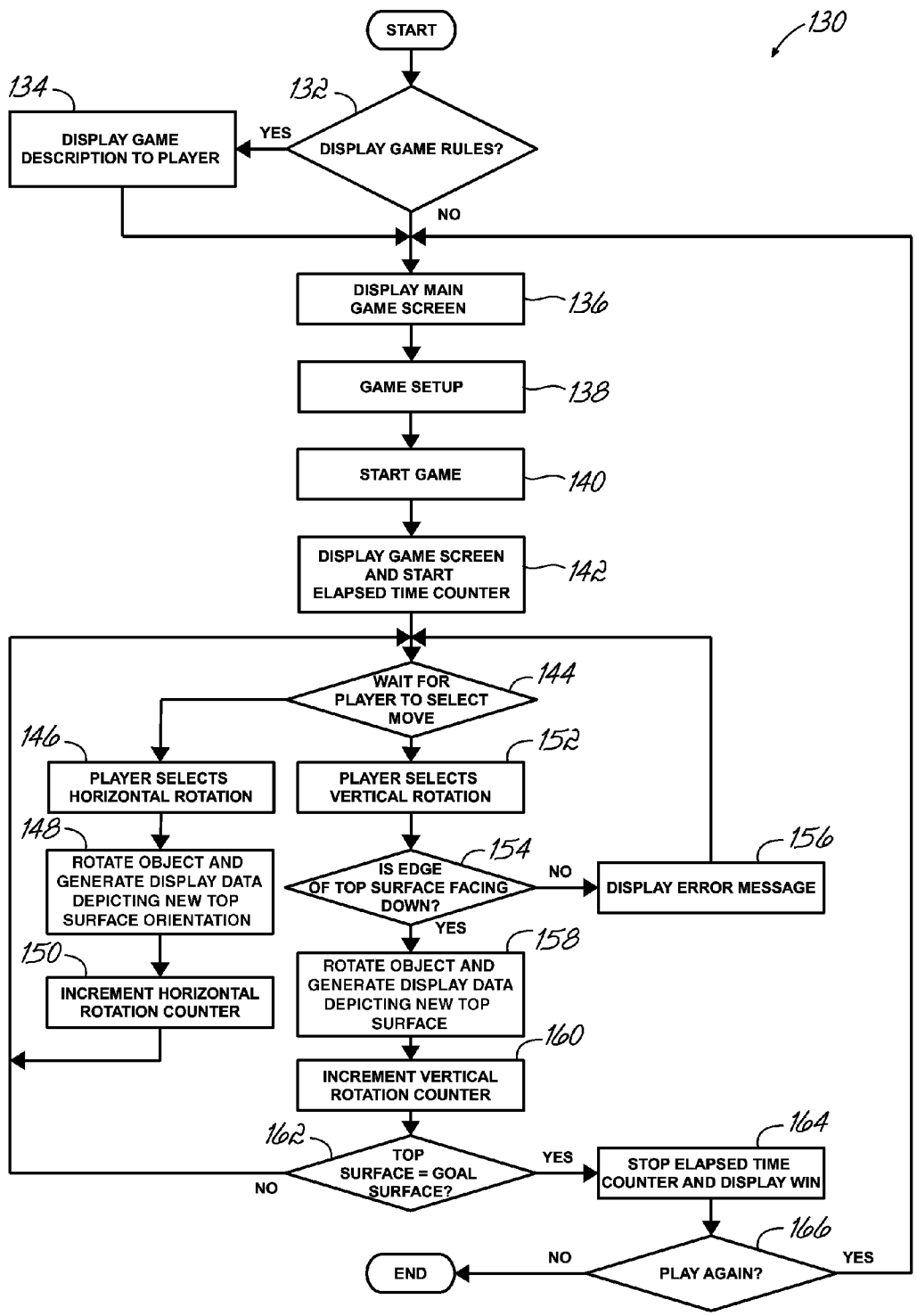
FIG. 17 is a flow chart of a process implemented by the game application in FIG. 16.

Referring now to FIG. 17, flowchart 130 provides a sequence of operations that may be performed by computer-implemented embodiments consistent with the invention. In block 132, the game may begin by asking the player if they wish to be presented with a description of the game. The query may be presented to the player in the form of text accompanied by clickable "YES" and "NO" buttons displayed on the user interface 104. If the player clicks on the "NO" button, or otherwise indicates that they wish to proceed directly to the start of the game ("NO" branch of decision block 132), the game application 120 will proceed to block 136. If the player clicks on the "YES" button, or otherwise indicates that they wish to see a description of game by entering commands over the user interface 104 ("YES" branch of decision block 132), the game application 120 may proceed to block 134.

In block 134, a description of the game is presented to the player. The description may be in the form of text and/or graphics presented to the player over a video display, and may include audio that accompanies the graphical images and/or provides verbal instructions. The game description may also provide demonstrations of game play and/or allow the player to play a practice game while providing instructions on how to move the virtual multi-surfaced object. Once the player has been provided with the game description, the game application 120 may proceed to block 136, either automatically or in response to an indication from the player that the player is ready to proceed.

Figure 18:
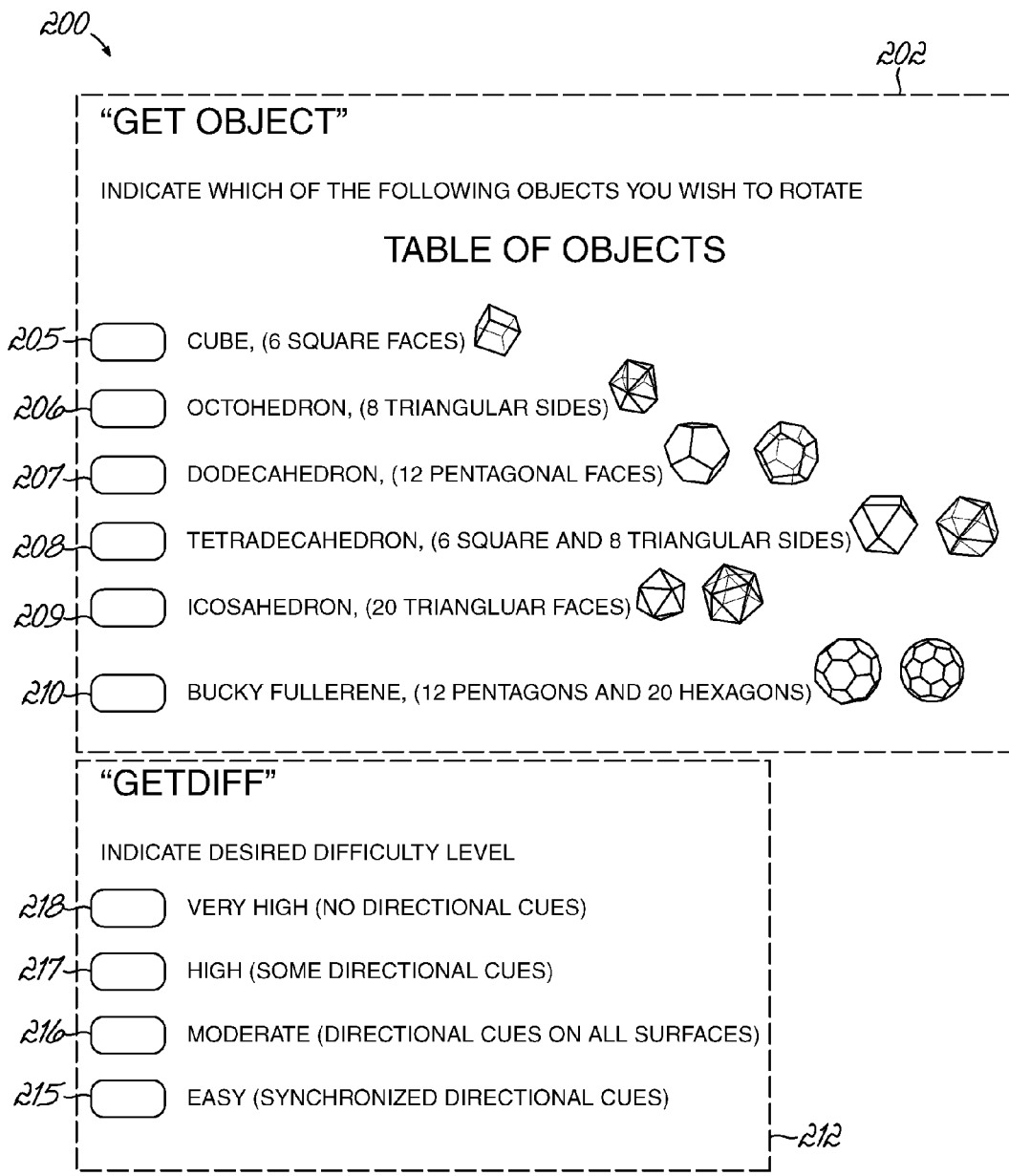
FIG. 18 is a diagrammatic illustration of one screen that may be generated by the process illustrated in FIG. 17.

In block 136, the game application displays the main screen of the game, which may provide the player with the ability to select desired characteristics of the game. Referring now to FIG. 18, a diagrammatic illustration of an exemplary embodiment of the main screen 200 consistent with the invention includes a plurality of player selectable virtual multi-surfaced object configurations 202, a plurality of player selectable difficulty levels 212, and a start game button 220. Each of the virtual multi-surfaced object configurations 202 may be associated with a selectable button 205-210, so that the player may select a desired object configuration by providing a suitable input to the user interface 104. For example, in some embodiments, the player may select a desired object configuration by clicking on the selectable button 205-210 associated with the desired object configuration using a computer mouse. Similarly, each of the selectable difficulty levels 212 may be associated with a selectable button 215-218 so that the player may select a desired difficulty level in a similar manner as described with respect to selecting from among the virtual multi-surfaced object configurations 202.

Returning to FIG. 17, in block 138, the player configures the game setup by selecting the desired game characteristics. Selectable game characteristics may include the type of virtual multi-surfaced object and the type of indicia or symbol associated with the surfaces of the object. Examples of virtual multi-surfaced object types from which the player may select as illustrated in FIG. 18 include: a cube having 6 square faces selectable by button 205, an octahedron having 8 triangular faces selectable by button 206, a dodecahedron having 12 pentagonal faces selectable by button 207, a tetradecahedron having 6 square and 8 triangular faces selectable by button 208, a icosahedron having 20 triangular faces selectable by button 209, and a Bucky fullerene having 12 pentagonal and 20 hexagonal faces selectable by button 210. Other embodiments of the main screen 200 may present other selectable polyhedrons that are not illustrated in FIG. 18. The main screen 200 may also provide the player with the option to specify a custom virtual multi-surfaced object. Because the virtual multi-surfaced object is a virtual object maintained as a mathematical model by the game application 120, it is not necessary that the object to be physically realizable in three dimensions. The virtual multi-surfaced object type is thus not limited by any particular number or shape of surfaces, but rather is a mathematical model defining a plurality of surfaces and the relationships between those surfaces, which may describe an essentially infinite variety of virtual multi-surfaced objects.

The player may also set the desired difficulty level by selecting the type of symbol or other identifying indicia to be associated with the surfaces of the virtual multi-surfaced object. To this end, the player may be presented with the choice of selecting from the plurality of difficulty levels 212. By way of example only and as illustrated in FIG. 18, the plurality of difficulty levels 212 may include: (1) an easy level selectable by button 215, (2) a moderate difficulty level selectable by button 216, (3) a high difficulty level selectable by button 217, and (4) a very high difficulty level selectable by button 218. Although illustrated in FIG. 18 as having four levels of difficulty, embodiments of the game may have a fewer or greater number of selectable difficulty levels, and the invention is not limited to any particular number of difficulty levels or virtual multi-surfaced objects. The difficulty level for navigating over a particular virtual multi-surfaced object may be adjusted by the amount of information provided to the player by the indicia associated with the surfaces of the object. By way of example, if the player selects the easy level 215, the indicia associated with a particular surface of the virtual multi-surfaced object may include synchronized directional cues. These synchronized directional cues may reduce the difficulty of selecting which direction to rotate the virtual multi-surfaced object by providing the player with sufficient information to determine: (1) the orientation of the surface being viewed, and (2) the identity of the neighboring surface associated with each edge of the displayed surface.

By way of example, a non-symmetric symbol or figure such as an arrow may provide an indication of the horizontal orientation of the displayed side. The viewed side may further include additional numbers, colors, or other identifying indicia at the edges that provide an indication to the player that identifies the neighboring surface sharing the associated edge of the displayed surface. Intermediate difficulty levels, such as the moderate difficulty level 216, may retain the directional cues, but omit the neighboring surface cues. As the difficulty rating increases, fewer directional cues may be provided. For example, the high difficulty level 217 may provide directional cues that don't fully define the horizontal orientation of the facing surface 232, such as a line without an arrow head or other partially symmetric symbol. At the very high difficulty level 218, each surface may be identified by a color or some other indicia that provides no directional cues, such as a completely symmetric symbol. At the very high difficulty level 218, the player may thus have to guess or remember the orientation of the viewed surface based on past moves. Returning to FIG. 17, once the player has finished setting up the game by selecting the virtual multi-surfaced object configuration and difficulty level, the game application 120 may proceed to block 140. The game may do so either automatically or in response to the player selecting a start game option, such as by clicking on the start game button 220.

Figure 19A:
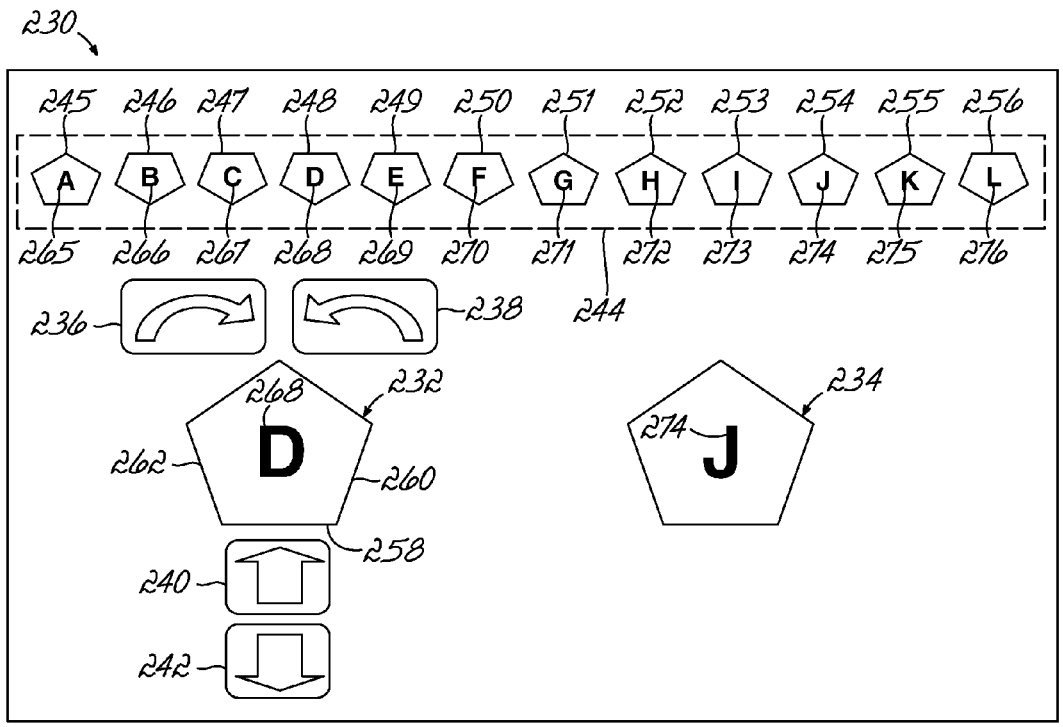
FIG. 19A is a diagrammatic illustration of another screen that may be generated by the process illustrated in FIG. 17.
Figure 19B:
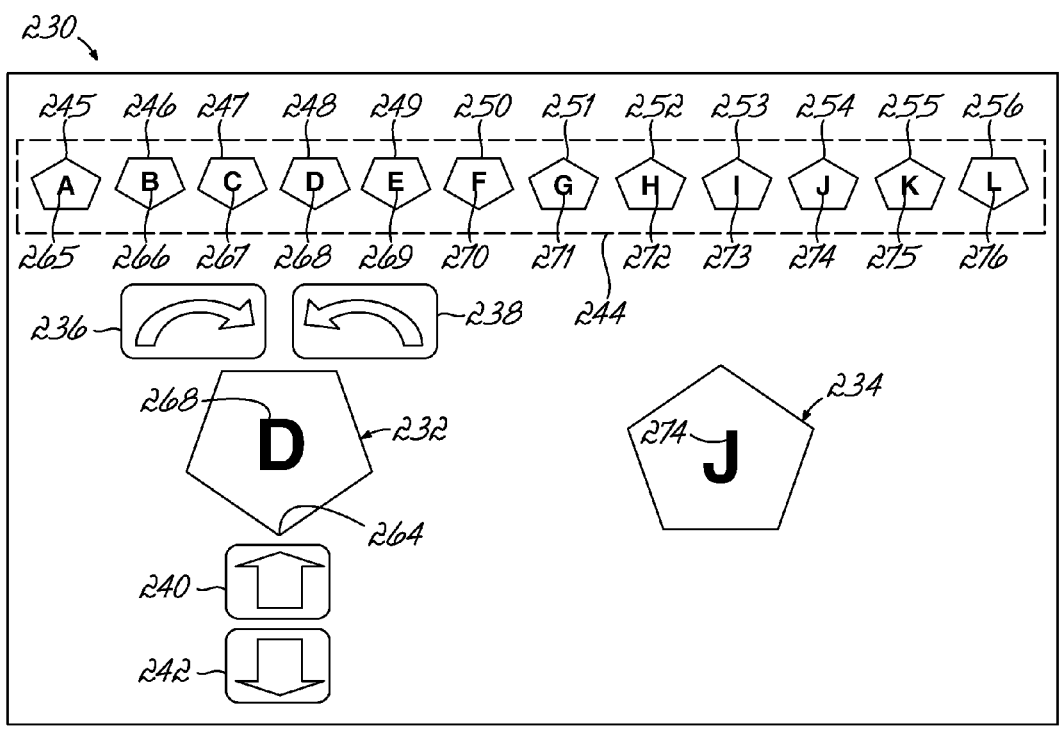
FIG. 19B is a diagrammatic illustration of yet another screen that may be generated by the process illustrated in FIG. 17.

In block 140, the game application 120 starts the game by setting counters that track the elapsed time, the number of rotations in the vertical plane (or flips), and the number of horizontal rotations to zero. The game application 120 then proceeds to block 142. In block 142, the game application 120 starts the elapsed time counter and causes the user interface 104 to display a game screen 230, which is diagrammatically illustrated in representative forms in FIGS. 19A and 19B. The game screen 230 may include an image of the currently viewed or "facing" surface 232 of the virtual multi-surfaced object, an image of the target or goal surface 234 of the object, buttons for implementing clockwise or counter-clockwise rotation of the object in the horizontal plane 236, 238, a button for controlling rotation of the object in a vertical plane (i.e., for "flipping" the object) 240, an undo button 242 that reverses the previous move, and a legend or key 244 that provides images of each of the surfaces 245-256 of the virtual multi-surfaced object. The key 244 may be provided to give the player a reference that assists in navigating across the virtual multi-surfaced object, which is illustrated in FIGS. 19A and 19B in a representative form of a dodecahedron. The images 232, 234, 245-256 of the surfaces may include indicia 265-276 that uniquely identifies the associated surface, which includes a goal indicia 274 associated with the goal surface 234.

In block 144 (FIG. 17), the game application 120 waits for the player to select a move. The game is played by navigating around the virtual multi-surfaced object through a series of rotational steps. To this end, the player may move the object by selecting one of the rotational buttons 236, 238, 240, or the undo button 242, which reverses the last move. Each time a rotational button is selected, the facing surface 232 changes to reflect the new orientation of the virtual multi-surfaced object, with the goal being to have the facing surface 232 match the goal surface 234. The player may thereby control, through a series of rotation commands, which surface of the virtual multi-surfaced object is displayed as the facing surface 232.

In block 146 (FIG. 17), the player selects a horizontal rotation button 236, 238 (or potentially the undo button 242 if the last rotation was a horizontal rotation). In response, the game application 120 may proceed to block 148 (FIG. 17). In block 148, the game application 120 rotates the virtual multi-surfaced object and generates new display data. The new display data may depict the facing surface 232 in a new orientation that conforms to the new position of the virtual multi-surfaced object. The internal representation of the facing surface 232 may be stored in memory 112 as a two-dimensional image in vector graphics format, in which case the display data may be generated by rasterization of the stored image. Because a vector graphics image is stored as a group of geometrical primitives based on mathematical equations, vector images must be converted to a raster image before the image may be displayed. Rasterization is a known process whereby a two-dimensional image represented in vector format is converted into individual pixels for display on a monitor. Typically, the stored image may be rotated using a suitable mathematical transformation while in vector format, and then rasterized to generate the rotated display data. Alternatively, internal representation of the facing surface may stored as a raster image, such as a Portable Network Graphics (PNG) image, in which case the color and intensity of each pixel may be determined directly from the image. Horizontal rotation of the facing surface may then be realized by performing a suitable geometric transformation on each pixel of the bitmap image, or by storing multiple images of each surface so that each possible horizontal orientation is represented by a separate bitmap image stored in memory 112.

Selecting the clockwise rotation button 236 may cause the facing surface 232 to rotate to the right so that the lower edge 258 of facing surface 232 is replaced by the edge 260 immediately to the right of the lower edge 258. Likewise, selecting the counter-clockwise rotation button 238 may cause the facing surface 232 to rotate to the left so that the lower edge 258 of facing surface 232 is replaced by the edge 262 immediately to the left of the lower edge 258. Normally, the horizontal step rotation per move will be an angle equal to a full rotation (360 degrees) divided by the number of edges, or sides comprising the facing surface 232. The facing surface 232 may thereby be rotated sufficiently each time one of the horizontal rotation buttons 236, 238 is selected so that the previous lower edge is replaced by a new lower edge that is adjacent to the previous lower edge—i.e., the facing surface is rotated so that one edge at a time is the lower edge.

Referring now to FIG. 19B, the facing surface 232 surface may sometimes be oriented so that a vertex 264 occupies the lowest point of the facing surface 232 rather than an edge. This orientation may result immediately after performing a vertical rotation (or flip) of the virtual multi-surfaced object, depending on the type of virtual multi-surfaced object and its current orientation. When the vertex 264 is oriented downward as illustrated in FIG. 19B, selecting either of the horizontal rotation buttons 236, 238 may cause a half-step rotation instead of a full step as previously described. The half-step rotation may result in the facing surface 232 being rotated sufficiently to place one of the edges forming the vertex 264 at the lower side of the facing surface 232. Placing an edge at the lower side of the facing surface (as opposed to a vertex) may allow subsequent vertical rotation of the virtual multi-surfaced object to produce a new facing surface 232. Once horizontal rotation of the facing surface 232 is complete, the game application 120 proceeds to block 150 (FIG. 17), where the horizontal rotation counter is incremented before the game application 120 returns to block 144.

In block 152 (FIG. 17), the player selects vertical rotation of the virtual multi-surfaced object, such as by selecting the vertical rotation button 240 (or potentially the undo button 242 if the last rotation was a vertical rotation). In response to the player selecting the vertical rotation button 240, the game application 120 proceeds to block 154 and checks if the facing surface 232 is oriented with an edge facing down. If the facing surface 232 is not oriented with an edge facing down, e.g., the orientation is as illustrated in FIG. 19B ("No" branch of decision block 154), the game application may proceed to block 156 and display an error message before returning to block 144. The error message may inform the player that the facing surface 232 must be horizontally rotated before a vertical rotation may be selected. If the facing surface 232 is oriented with an edge facing down, e.g., the orientation is as illustrated in FIG. 19A ("Yes" branch of decision block 154), the game application 120 may proceed to block 158.

In block 158, the game application 120 vertically rotates, or flips the virtual multi-surfaced object so that the neighboring surface sharing the downward facing edge is displayed as the new facing surface 232. To this end, the game application 120 may determine which surface of the virtual multi-surfaced object to display using any suitable method, such as a lookup table. In embodiments employing a lookup table, the lookup table may include information that defines the relationships between each of the surfaces of the virtual multi-surfaced object. The lookup table may thereby provide the possible facing surfaces that may result from vertical rotations of the object based on the angular position of the current facing surface 232. The lookup table may thereby allow the game application 120 to determine which surface to display as the new facing surface 232, as well as the proper horizontal angle at which to display the new facing surface 232. Once the game application 120 has determined which surface to display and at what angle to display the surface, the game application 120 may generate display data depicting the new facing surface 232. The display data may be generated from an image file stored in memory 112 that corresponds to the new facing surface in a similar manner as described previously with respect to block 148. This display data may replace the image of the old facing surface 232 with the new facing surface 232 so that the displayed surface represents the new orientation of the virtual multi-surfaced object. This replacement may include graphically flipping the old image of the facing surface 232 away to reveal the new image, thereby simulating rotation of the object. The game application 120 may then proceed to block 160 and increment the vertical rotation counter before proceeding to block 162.

In block 162, the game application 120 compares the facing surface 232 to the goal surface 234. If the facing surface 232 is the same as the goal surface 234 ("Yes" branch of decision block 160), the game application 120 may proceed to block 164. In block 164, the game application 120 may stop the elapsed time counter and display an indication that the player has won, which may include displaying game statistics such as the number of horizontal and vertical rotations, and/or elapsed time. The game application 120 may then proceed to block 166, where the game application provides the player with the option to play again. If the player selects play again ("Yes" branch of decision block 166), the game application 120 may proceed to block 136 and display the main screen of the game, thereby beginning a new game. If the player opts to not play again ("No" branch of decision block 166), the player exits the game. If the facing surface 232 does not match the goal surface 234, the game application 120 may return to block 144 and wait for the player to select another move. The game application 120 may thereby continue the game until the facing surface 232 matches the goal surface 234, or the player quits the game.

As discussed above, the object of the game is for the player to rotate and flip the object until a specified goal surface is visible. The problem the player must solve is thus how to rotate and flip a specific object until a goal surface becomes visible. For a specific object, the specific characteristics and specific orientation of the surfaces remains identical from game to game. In a specific embodiment of the invention, the player may be provided with a score in order to track improvement and as a way to compare the spatial ability of one player to another. To this end, the player may be presented with a number of "trials" to learn to solve a specific problem. On each trial the player is presented with the goal surface and the currently visible surface as discussed above. A trail continues until the goal surface becomes the newly visible surface as a result of flips and rotations, i.e. until the player has reached the goal surface. At the completion of the trail a new trial is initiated in which the player is presented with a new goal surface and a new currently visible surface from the same object. Trials may be repeated until a specific time has elapsed or a specific number of trials has been completed. A score may then be calculated based on the number of flips, rotations, and/or the time it takes to complete the trials.

When the player initiates the game, they may choose a specific object and level of difficulty that they want to play. The program then initiates a problem by choosing a specific orientation of the different surfaces of the chosen object. Within each problem the program may present a series of trials. For each trial, the program chooses a goal surface and an initial visible or current surface. During each trial, the player flips and rotates the object to reveal a new visible surface. The trial is complete when the manipulations cause the goal surface to become the new visible surface. In response to the goal surface becoming the new visible surface, the program stops the timer, and records the number of rotations, number of flips, and the time required to reach the goal surface. The program may initiate a new trial by choosing new goal and visible surfaces, and restarting the timer. Note that the orientation of the surfaces for this particular embodiment of the invention does not change between trials.

Thus the player is still playing with the same object and attempting to solve the same problem.

In one embodiment of the game, the program continues through trials until a specified number of trials are completed. A score may then calculated by subtracting from a maximum score (say 100%) a simple algebraic function of the time, number of rotations, and/or the number of flips required to complete those trials. A high score may result when the player reaches the goal object in each trial with a minimum number of extraneous flips and rotations, and/or in a shorter period of time.

In another embodiment of the game, new trials may be presented for a specified period of time. The score may then be calculated by a simple algebraic equation in which the number of completed trials is multiplied by a constant (say 100), and the number of flips and rotations, each multiplied by a different constant (for example, 30 and 15 respectively) is subtracted from that value to produce a score. A high score would result when the player reaches the goal object more often (i.e. completes a higher number of trials) in the specified time with a minimum number of extraneous flips and rotations.

After the score and details are presented to the player for the current problem, the player may be further presented with a number of choices. These choices may include: (1) trying the same problem again, (i.e. the same object with no change in the relative orientation of the sides), (2) trying a new problem under the same conditions (i.e. a similar object constructed from the same surfaces, but with a different orientation of the sides), (3) choosing a completely different problem (i.e. by returning to the opening screen), or (4) terminating the game.

While the present invention has been disclosed by reference to the details of preferred embodiments of the invention, it is to be understood that the disclosure is intended as an illustrative rather than in a limiting sense, as it is contemplated that modifications will readily occur to those skilled in the art, within the spirit of the invention and the scope of the amended claims.

What is claimed is:

1. A method of exercising three dimensional spatial-cognitive processing abilities of a user by playing a game on a computing device that rotates, in response to user input, a virtual multi-surfaced object from a starting position to a goal position, the virtual multi-surfaced object including a plurality of surfaces, each of the plurality of surfaces having a unique indicia associated therewith, the computing device having a display, an interface, a processor, and a non-transitory computer readable medium encoded with instructions that, when executed by the processor, cause the computing device to perform the steps of:

generating first display data to depict a first indicia associated with a first surface of the virtual multi-surfaced object, wherein the first surface is in a facing orientation when the virtual multi-surfaced object is oriented in the starting position;

generating second display data to depict a goal indicia associated with a goal surface among the plurality of surfaces on the virtual multi-surfaced object, wherein the goal surface is in a facing orientation when the virtual multi-surfaced object is oriented in the goal position;

in response to a first user input, rotating the virtual multi-surfaced object in a first plane;

in response to a second user input, rotating the virtual multi-surfaced object in a second plane that is different from the first plane; and in response to rotating the virtual multi-surfaced object in the first plane, generating third display data to depict a second surface of the virtual multi-surfaced object and the respective second indicia associated therewith, the third display data causing the second indicia to replace the first indicia, wherein the second surface represents a surface of the plurality of surfaces brought into a facing orientation by the rotation of the virtual multi-surfaced object in the first plane.

2. The method of claim 1, wherein the second surface is defined to be adjacent to the first surface of the virtual multi-surfaced object.

3. The method of claim 1, further comprising:
in response to rotating the object in either the first plane or the second plane, incrementing a counter that indicates the number of rotations performed.

4. The method of claim 1, further comprising:
determining whether the second surface is the goal surface.

5. The method of claim 4, further comprising:
in response to determining that the second surface is the goal surface, generating fourth display data to depict a value associated with a counter that indicates the number of rotations performed and generating fifth display data to depict an amount of time taken to proceed from an initial surface to the goal surface.

6. The method of claim 4, further comprising:
generating a statistical analysis of a difference between the number of rotations performed and a minimum number of rotations that could have been performed to proceed from an initial surface to the goal surface.

7. The method of claim 1 further comprising:
generating fourth display data to query in human detectable form a number of surfaces to assign to the virtual multi-surfaced object; and
in response to user input, setting the number of surfaces assigned to the virtual multi-surfaced object.

8. The method of claim 1 further comprising:
generating fourth display data to query in human detectable form a desired level of difficulty; and
in response to user input, setting the level of difficultly.

9. The method of claim 8, wherein setting the level of difficulty includes selecting a level of symmetry for the unique indicia associated with each of the surfaces of the plurality of surfaces.

10. The method of claim 8, wherein setting the level of difficulty includes defining a number of surfaces to assign to the virtual multi-surfaced object.

11. The method of claim 1, wherein at least one of the unique indicia associated with each surface of the plurality of surfaces of the virtual multi-surfaced object includes an alphanumeric character, a color, a symbol, a figure, a picture, or combinations thereof.

12. The method of claim 1, further comprising:
contemporaneously with generating the second display data to depict the goal indicia associated with the goal surface, starting a timer.

13. The method of claim 12, further comprising:
in response to determining the second surface is the goal surface, stopping the timer.

14. The method of claim 1, further comprising:
generating fourth display data to depict a directional indication to indicate a direction in which to axially rotate the virtual multi-surfaced object to display the second surface; and generating fifth display data to depict the second indicia in a manner associating the second indicia with the directional indication.

15. The method of claim 1, further comprising:
generating fourth display data to depict at least one directional indication in which to axially rotate the virtual multi-surfaced object to display the second surface.

16. The method of claim 1, wherein generating third display data to depict the second surface of the virtual multi-surfaced object includes:
accessing a data structure that relates the first surface to each additional surface adjacent thereto, each adjacent surface being a surface to which the virtual multi-surfaced object may be rotated; and
in response to the user input, determining that the second surface has been selected.

17. The method of claim 1 further comprising:
in response to rotating the virtual multi-surfaced object in the second plane, generating fourth display data to depict a third surface of the virtual multi-surfaced object and the respective third indicia associated therewith, the fourth display data causing the third indicia to replace the first indicia,
wherein the third surface represents a surface of the plurality of surfaces brought into a facing orientation by the rotation of the virtual multi-surfaced object in the second plane.

18. The method of claim 1 further comprising:
in response to rotating the virtual multi-surfaced object in the second plane, generating fourth display data to depict the first surface of the virtual multi-surfaced object and the respective fist indicia associated therewith at a changed angle.

19. The method of claim 1, wherein only one surface of the object is displayed at a time.

20. A computer program product comprising:
a non-transitory computer readable storage medium; and
program instructions stored on the computer readable storage medium,
wherein the program instructions, when executed by a processor, cause the processor to:
generate first display data to depict a first indicia associated with a first surface of the virtual multi-surfaced object, wherein the first surface is in a facing orientation when the virtual multi-surfaced object is oriented in the starting position;
generate second display data to depict a goal indicia associated with a goal surface among the plurality of surfaces on the virtual multi-surfaced object, wherein the goal surface is in a facing orientation when the virtual multi-surfaced object is oriented in the goal position;
in response to a first user input, rotate the virtual multi-surfaced object in a first plane;
in response to a second user input, rotate the virtual multi-surfaced object in a second plane that is different from the first plane; and
in response to rotating the virtual multi-surfaced object in the first plane, generate third display data to depict a second surface of the virtual multi-surfaced object and the respective second indicia associated therewith, the third display data causing the second indicia to replace the first indicia,
wherein the second surface represents a surface of the plurality of surfaces brought into a facing orientation by the rotation of the virtual multi-surfaced object in the first plane.

21. A computing device, comprising:
a processor; and
a memory,
wherein the memory includes instructions that, when executed by the processor, cause the processor to:
generate first display data to depict a first indicia associated with a first surface of the virtual multi-surfaced object, wherein the first surface is in a facing orientation when the virtual multi-surfaced object is oriented in the starting position;
generate second display data to depict a goal indicia associated with a goal surface among the plurality of surfaces on the virtual multi-surfaced object, wherein the goal surface is in a facing orientation when the virtual multi-surfaced object is oriented in the goal position;
in response to a first user input, rotate the virtual multi-surfaced object in a first plane;
in response to a second user input, rotate the virtual multi-surfaced object in a second plane that is different from the first plane; and
in response to rotating the virtual multi-surfaced object in the first plane, generate third display data to depict a second surface of the virtual multi-surfaced object and the respective second indicia associated therewith, the third display data causing the second indicia to replace the first indicia,
wherein the second surface represents a surface of the plurality of surfaces brought into a facing orientation by the rotation of the virtual multi-surfaced object in the first plane.

22. A method comprising:
communicating, with a first computing device, instructions to a second computing device, wherein the instructions cause a processor in the second computing device to:
generate first display data to depict a first indicia associated with a first surface of the virtual multi-surfaced object, wherein the first surface is in a facing orientation when the virtual multi-surfaced object is oriented in the starting position;
generate second display data to depict a goal indicia associated with a goal surface among the plurality of surfaces on the virtual multi-surfaced object, wherein the goal surface is in a facing orientation when the virtual multi-surfaced object is oriented in the goal position;
in response to a first user input, rotate the virtual multi-surfaced object in a first plane;
in response to a second user input, rotate the virtual multi-surfaced object in a second plane that is different from the first plane; and
in response to rotating the virtual multi-surfaced object in the first plane, generate third display data to depict a second surface of the virtual multi-surfaced object and the respective second indicia associated therewith, the third display data causing the second indicia to replace the first indicia,
wherein the second surface represents a surface of the plurality of surfaces brought into a facing orientation by the rotation of the virtual multi-surfaced object in the first plane.

* * * * *

UNITED STATES PATENT AND TRADEMARK OFFICE
CERTIFICATE OF CORRECTION

| | | |
|---|---|---|
| PATENT NO. | : 8,646,778 B2 | |
| APPLICATION NO. | : 13/240408 | |
| DATED | : February 11, 2014 | |
| INVENTOR(S) | : Phillip J. Best | |

It is certified that error appears in the above-identified patent and that said Letters Patent is hereby corrected as shown below:

In the Specification

Column 1

Line 10, after "Jul. 21, 2009", insert --by Phillip J. Best,--.

Line 10, after "Dec. 14, 2010", delete "by Phillip J. Best".

Line 12, after "Feb. 26, 2007", insert --by Phillip J. Best,--.

Line 13, after "Sep. 8, 2009", delete "by Phillip J. Best".

Column 2

Line 23, "presents" should be --present--.

Column 14

Line 64, delete the word "that" and replace with the word --for--.

Column 16

Line 49, "may stored" should be --may be stored--.

Signed and Sealed this
Tenth Day of June, 2014

Michelle K. Lee
*Deputy Director of the United States Patent and Trademark Office*

CERTIFICATE OF CORRECTION (continued)
U.S. Pat. No. 8,646,778 B2

Column 18

Line 34, "remains" should be --remain--.

Line 41, "trail" should be "trial".

Line 44, "trail" should be --trial--.

Column 19

Line 5, after the word "then", insert --be--.

Line 39, "amended claims" should be --appended claims--.